(12) United States Patent
Thomas et al.

(10) Patent No.: US 7,230,570 B2
(45) Date of Patent: Jun. 12, 2007

(54) ANTENNA SYSTEM

(75) Inventors: Louis David Thomas, Malvern (GB);
Philip Edward Haskell, Malvern (GB);
Clive Richard Harding, Malvern (GB)

(73) Assignee: Quintel Technology Limited (GB)

( * ) Notice: Subject to any disclaimer, the term of this patent is extended or adjusted under 35 U.S.C. 154(b) by 269 days.

(21) Appl. No.: 10/495,478

(22) PCT Filed: Oct. 31, 2002

(86) PCT No.: PCT/GB02/04930

§ 371 (c)(1),
(2), (4) Date: May 13, 2004

(87) PCT Pub. No.: WO03/043127

PCT Pub. Date: May 22, 2003

(65) Prior Publication Data

US 2004/0252055 A1    Dec. 16, 2004

(30) Foreign Application Priority Data

Nov. 14, 2001 (GB) ................................ 0127355.6
Oct. 19, 2002 (GB) ................................ 0224341.8

(51) Int. Cl.
*H01Q 3/22* (2006.01)
(52) U.S. Cl. .................................................. 342/372
(58) Field of Classification Search ................ 342/368, 342/372, 373, 375, 383
See application file for complete search history.

(56) References Cited

U.S. PATENT DOCUMENTS 2,041,600 A    5/1936    Friis (Continued)

FOREIGN PATENT DOCUMENTS

AU    38746/93    7/1993

(Continued)

OTHER PUBLICATIONS

Strickland, Peter "Microstrip Base Station Antennas for Cellular Communications", IEEE, pp. 166-171 (1991).

(Continued)

*Primary Examiner*—Dao L. Phan
(74) *Attorney, Agent, or Firm*—McDonnell Boehnen Hulbert & Berghoff LLP

(57) ABSTRACT

An antenna system for use in transmitting and/or receiving at least two signals, whereby a first one of said signals is generated in a first operator frequency band by a first operator and a second one of said signals is generated in a second operator frequency band by a second operator wherein the antenna system comprises an antenna assembly having an adjustable angle of electrical tilt, and including a plurality of antenna elements (E1–En) for transmitting and/or receiving said signals, wherein the antenna elements are mounted upon an antenna carrier and are arranged in at least two sub-arrays, each sub-array including one or more of said elements, a control means for controlling electrically the phase of signals transmitted and/or received by said antenna assembly, thereby to control the angle of electrical tilt of said antenna assembly and a combiner means for enabling said antenna assembly to transmit and/or receive substantially simultaneously a first one of said signals at a first angle of electrical tilt and a second one of said signals at a second angle of electrical tilt.

28 Claims, 17 Drawing Sheets

U.S. PATENT DOCUMENTS

| | | | |
|---|---|---|---|
| 2,239,775 | A | 4/1941 | Bruce |
| 2,245,660 | A | 6/1941 | Feldman et al. |
| 2,247,666 | A | 7/1941 | Potter |
| 2,961,620 | A | 11/1960 | Sommers |
| 3,277,481 | A | 10/1966 | Robin et al. |
| 3,522,558 | A | 8/1970 | Stafford et al. |
| 4,211,894 | A | 7/1980 | Watanabe et al. |
| 4,241,352 | A | 12/1980 | Alspaugh et al. |
| 4,249,181 | A | 2/1981 | Lee |
| 4,277,787 | A | 7/1981 | King |
| 4,788,515 | A | 11/1988 | Wong et al. |
| 4,881,082 | A | 11/1989 | Graziano |
| 5,281,974 | A | 1/1994 | Kuramoto et al. |
| 5,691,987 | A | 11/1997 | Friederichs |
| 5,781,865 | A | 7/1998 | Gammon |
| 5,825,762 | A | 10/1998 | Kamin et al. |
| 6,016,123 | A | 1/2000 | Barton et al. |
| 6,097,267 | A | 8/2000 | Hampel |
| 6,363,263 | B1 | 3/2002 | Reudink et al. |
| 6,411,612 | B1 | 6/2002 | Halford |
| 6,441,700 | B2 | 8/2002 | Xu |
| 6,504,510 | B2 | 1/2003 | Kim |
| 6,504,516 | B1 | 1/2003 | Davis |
| 6,529,166 | B2 | 3/2003 | Kanamaluru |
| 6,573,875 | B2 | 6/2003 | Zimmerman et al. |
| 6,661,375 | B2 | 12/2003 | Rickett et al. |
| 6,667,714 | B1 | 12/2003 | Solondzrf |
| 2001/0012788 | A1 | 8/2001 | Gammon |

FOREIGN PATENT DOCUMENTS

| | | |
|---|---|---|
| AU | 664625 | 11/1995 |
| EP | 0 575 808 | 12/1993 |
| EP | 0 896 383 | 2/1999 |
| EP | 0 939 452 | 9/1999 |
| EP | 0 531 090 | 3/2000 |
| GB | 1 314 693 | 4/1973 |
| JP | 61-006901 | 1/1986 |
| JP | 61-172411 | 8/1986 |
| JP | 02-174302 | 7/1990 |
| JP | 04-320121 | 11/1992 |
| JP | 04-320122 | 11/1992 |
| JP | 05-37222 | 2/1993 |
| JP | 05-075340 | 3/1993 |
| JP | 05-121902 | 5/1993 |
| JP | 05-121915 | 5/1993 |
| JP | 140985 | 5/1994 |
| JP | 06-196927 | 7/1994 |
| JP | 06-260823 | 9/1994 |
| JP | 06-326501 | 11/1994 |
| WO | WO 89/07837 | 8/1989 |
| WO | WO 92/16061 | 9/1992 |
| WO | WO 93/15569 | 8/1993 |
| WO | WO 95/10862 | 4/1995 |
| WO | WO 97/44914 | 11/1997 |
| WO | WO 01/29926 | 4/2001 |

OTHER PUBLICATIONS

Bacon, "Variable Elevation Beam-Aerial Systems for 1 ½ Metres", Journal IEE, pp. 539-544 (1946).

Forster, et al. "A Conical Beam Ship Array Antenna with Infinitely Variable Control of the Elevation Angle", pp. 17-20 (1973).

Hansen, "Microwave Scanning Antennas" vol. 3 Array Systems, pp. 2-7 (1966).

Smith, textbook: "Circuits, Devices and Systems", A First Course in Electrical Engineering, $4^{th}$ Ed., pp. 680-681 (1984).

Okuyama et al., "Base-Station Antenna Systems for Car and Handheld Cellular Phones", Mitsubishi Denki Giho, vol. 68, No. 12, pp. 23-26 (1994).

Sumitomo Technical Review, Sep. 1993.

Brochure, "Brown Boveri Phaser for the Horizontal Slewing of Curtain Antennas", Boveri & Cie AG, Mannheim, RFA Classif. n 1601/242.

CEL-901 Cellular Antenna Controller User's Manual, issued on Apr. 2, 1992, in the name of CAL Corporation (1991).

Murphy, "Antenna-sharing offers solution to planning concerns", http://wireless.iop.org/article /feature 2/5/5.

Harris, "Network sharing boosts 3G", http://wireless.iop.org/article/feature 2/7/5.

ANTENNA SYSTEM

BACKGROUND OF THE INVENTION (1) Field of the Invention

The present invention relates to an antenna system and particularly, but not exclusively, to a phased array antenna system having a plurality of antenna elements arranged in at least two sub-arrays. The antenna system is suitable for use in many telecommunications systems but finds particular application in cellular mobile radio networks, commonly referred to as mobile telephone networks. More specifically, the antenna system of the present invention may be used with third generation (3G) mobile telephone networks and the Universal Mobile Telephone System (UMTS). The invention also relates to a phase compensation apparatus for use in an antenna system.

(2) Description of the Art

Operators of cellular mobile radio networks generally employ their own base-stations, each of which includes one or more antennas. In a cellular mobile radio network, the antennas define the desired coverage area which is generally divided into a number of overlapping cells, each associated with a respective antenna and base station. Each cell contains a fixed-location base station which maintains radio communication with all of the mobile radios in that cell. The base stations themselves are interconnected by other means of communication, usually fixed land-lines arranged in a grid or meshed structure, allowing mobile radios throughout the cell coverage area to communicate with each other as well as with the public telephone network outside the cellular mobile radio network.

The antennas used in such networks are often composite devices known as phased array antennas which comprise a plurality (usually eight or more), or array, of individual antenna elements or dipoles. The direction of maximum sensitivity of the antenna, i.e. the direction of the main radiation beam or "boresight" of the antenna pattern, can be altered by adjusting the phase relationship between the signals fed to the antenna elements. This has the effect of allowing the beam to be steered to modify the coverage area of the antenna.

In particular, operators of phased array antennas in cellular mobile radio networks have a requirement to adjust the vertical radiation pattern (VRP), so as to alter the vertical angle of the main beam, also known as the "tilt", since this has a significant effect on the coverage area of the antenna. Adjustment of the coverage area may be required, for example, owing to changes in the network structure or the addition or removal of other base stations or antennas in the cell.

The adjustment of the angle of tilt of an antenna is known and is conventionally achieved by mechanical means, electrical means, or both. When the angle of tilt of the antenna is adjusted mechanically, for example by mechanically moving the antenna elements themselves or by mechanically moving the housing (or "radome") for the elements, this is known as adjusting the angle of "mechanical tilt". When the angle of tilt of the antenna is adjusted electrically, for example by changing the time delay or phase of signals fed to each element (or group of elements) in the array without physically moving either the housing for the elements, the antenna elements themselves or any other part of the antenna radome, this is commonly referred to as adjusting the angle of "electrical tilt".

The effect of adjusting either the angle of mechanical tilt or the angle of electrical tilt is to reposition the boresight so that it points either above or below the boresight established by conventional mechanical or electrical tilt mechanisms, and hence increases or decreases the coverage area of the antenna.

Heretofore, adjustment of the mechanical or electrical tilt of a cellular radio antenna has been possible only by manually adjusting the angle of tilt at the antenna itself, for example by physically moving the antenna housing or radome in the case of mechanical tilt adjustment or by adjusting mechanical devices for applying variable amounts of delay to the elements in the antenna in the case of electrical tilt adjustment.

One disadvantage of employing such mechanical or electrical tilt adjustment methods is that the methods are difficult and time consuming to perform. Additionally, such adjustment methods result in the direction of the boresight being fixed at the adjusted angle of tilt for all transmitted or received signals, until such time as the angle of tilt is adjusted again. Consequently, the antenna cannot be shared by more than one operator unless the tilt required by each operator is identical. In practice this is rare and, in general, operators require an individual angle of tilt in order to optimise the cell coverage of the antenna for their particular deployment of base stations.

In any event, although the sharing of base stations, antennas and facilities is desirable, there are problems involved in doing so. In the United Kingdom, respective transmit/receive frequency bands are allocated to five 3G operators for transmission between mobile radios and base stations. The five transmit bands, or operator frequency bands, are contiguous, as are the five receive bands, i.e. there are no gaps between adjacent frequency bands. Consequently, unless complex and accurate filtering of signals is employed by the transmitting and receiving apparatus associated with the antenna, the resulting overlapping and interference of signals has a deleterious effect on system performance.

One known base station architecture provides separate transmit and receive antennas whilst another common system employs a duplexer to allow a single antenna to be used for both transmission and reception. These arrangements are adequate when only one operator is required to use the base station and antenna but when more than one operator wishes to use the system there are difficulties.

One known solution for base station sharing is for each operator to use a different antenna. In practice, this is achieved by the use of a shared antenna mast supporting a number of antennas, one for each operator. However, in order to avoid mutual interference, the antennas require adequate separation and the height of the mast may need to be increased, or a stronger structure may need to be used, to enable the mast to withstand high winds. This increases the weight of the mast which, in turn, increases mast cost. Furthermore, sites which can accommodate a larger mast are difficult to obtain and planning permission or zoning problems may be encountered. Larger masts are also environmentally obtrusive and unsightly.

As a consequence, many operators of mobile cellular radio networks employ their own base stations with their associated masts and antennas. There is little sharing of sites and any sharing that does occur is limited to the sharing of the mast only and not the antennas. The introduction of the so-called third generation (3G) mobile radio system will demand an increased number of base station sites. Thus, there are likely to be difficulties in acquiring the necessary real estate, and site sharing will become an increasingly attractive option.

SUMMARY OF THE INVENTION

It is an aim of the present invention, therefore, to provide a method and/or apparatus which allows multiple operators of a base station site to share a common antenna whilst enabling the angle of electrical tilt of the antenna to be adjusted electrically and individually by each operator. It is a further aim of the invention to enable the angle of electrical tilt of the antenna to be adjusted remotely and to be different in transmit and receive.

In the following description, the term "antenna system" is used in place of the previous term "antenna" to describe a system having an "antenna assembly", that is an array of antenna elements, and control means for controlling signals supplied to the antenna elements in the antenna assembly.

According to a first aspect of the present invention, there is provided an antenna system for use in transmitting and/or receiving at least two signals, whereby a first one of said signals is generated in a first operator frequency band by a first operator and a second one of said signals is generated in a second operator frequency band by a second operator, comprising:

an antenna assembly having an adjustable angle of electrical tilt, and including a plurality of antenna elements for transmitting and/or receiving said signals, wherein the antenna elements are mounted upon an antenna carrier and are arranged in at least two sub-arrays, each sub-array including one or more of said elements, control means for controlling electrically the phase of signals transmitted and/or received by said antenna assembly, thereby to control the angle of electrical tilt of said antenna assembly; and combiner means for enabling said antenna assembly to transmit and/or receive substantially simultaneously a first one of said signals at a first angle of electrical tilt and a second one of said signals at a second angle of electrical tilt.

The first and second signals transmitted and/or received by the antenna assembly are used by different network operators and will thus have a different frequency. Advantageously, therefore, the antenna system allows the antenna assembly to be used by a plurality of operators.

Moreover, where the angle of electrical tilt can be adjusted from a location remote from the antenna assembly, each operator is able to adjust their cell coverage provided by the antenna assembly without visiting the base station site. Adjustment of the angle of electrical tilt may be required, for example, to optimise coverage as the network is deployed, to optimise the network in response to measured performance parameters, daily in response to the movement of urban commuters or periodically to meet the needs of a particular event such as an exhibition or sports event.

In one embodiment, the antenna system is arranged to operate in a transmit mode, in which at least two signals are transmitted by the antenna assembly, the combiner means being arranged to receive phase adjusted signals from said control means and to transmit substantially simultaneously a first one of said signals at a first angle of electrical tilt and a second one of said signals at a second angle of electrical tilt. The apparatus is also, however, preferably operable in a receive mode in which the antenna assembly receives signals.

In a preferred embodiment, the apparatus includes first and second feeder lines for supplying first and second signals of a first polarisation to and from the antenna assembly.

The apparatus preferably further includes third and fourth feeder lines for supplying third and fourth signals of a second polarisation, opposite in sign to the first polarisation, to and from the antenna assembly.

In a more preferred embodiment, the apparatus includes a maximum of four feeder lines for supplying signals to and from the antenna assembly.

The apparatus is advantageous, in that multiple operators can use the system and transmit and/or receive signals in different operator frequency bands, each with different angles of electrical tilt, if required, and this is achieved with the use of only four feeder lines, or only two if only one polarisation is required. The apparatus is therefore relatively simple, and cost effective, despite its ability to serve many different operators.

Furthermore, as a number of operators can share one antenna assembly, the requirement for additional base stations or antenna assemblies is avoided.

For the purpose of this specification, the phrase "operator" or "user" is intended to mean an operator of a cellular radio network, as opposed to the site operator who would be responsible for the antenna site.

For example, said control means may include a first control arrangement associated with a first one of said signals and a second control arrangement associated with a second one of said signals, and the combiner means may be arranged to receive the first one of said signals from the first control arrangement and the second one of said signals from the second control arrangement, and to supply a combined signal to said antenna assembly.

Preferably, the control means is arranged to electrically control the phase of signals supplied to at least one of said sub-arrays from a location remote from said antenna assembly, thereby to control the angle of electrical tilt of said antenna assembly.

The control means may include a plurality of differential phase control units, each differential phase control unit being associated with a respective one of said operators of said antenna system.

Each of the differential phase control units may include first and second differential phase control sub-units, said first differential phase control sub-units being arranged to electrically control the phase of signals supplied thereto for transmission by said antenna assembly and said second differential phase control unit being arranged to electrically control the phase of signals supplied thereto, said signals having been received by said antenna assembly.

Preferably, the combiner means include first and second combiner units, where each combiner unit includes a respective transmit combiner network and a respective receive splitter network, said transmit combiner network having a plurality of inputs for connection to transmitter means of a corresponding plurality of operators of said antenna system, said transmit combiner network being arranged to multiplex signals applied to said inputs by said transmitter means, thereby to output a single multiplexed signal.

The transmit combiner network preferably includes a first transmit multiplexer arranged to receive at least two signals, each from an associated respective transmitter, and a second transmit multiplexer arranged to receive at least two signals, each from an associated respective transmitter, wherein each of the first and second transmit multiplexers is provided with a band pass filter arrangement for filtering signals received from a first one of the associated respective transmitters with a pass band separated by a stop-band from a pass-band of the or each other of the associated respective transmitters.

Preferably, each band pass filter arrangement is arranged to generated a perfectly combined (as herein defined) output signal.

The combined output signals from the band pass filter arrangement are preferably input to a combiner unit for generating a combined signal having a substantially perfectly combined continuous frequency spectrum.

Preferably, said receive splitter network has a plurality of outputs for connection to receiver means of a corresponding plurality of operators of said antenna system, said receive splitter network being arranged to split a receive signal received by said antenna assembly thereby to apply said received signal to each of said receiver means.

In a further preferred embodiment, the combiner means is arranged to generate phase adjusted output signals simultaneously for each of a plurality of operators, the antenna system further comprising a splitter arrangement for receiving said phase adjusted output signals and for splitting and distributing said phase adjusted output signals to the elements of the antenna assembly.

The splitter arrangement is preferably arranged to distribute signal strength of said phase adjusted signals in a substantially uniform distribution.

In a still further preferred embodiment, the apparatus may include phase compensation means for ensuring the phase difference applied to the signals on the feeder lines remains substantially constant between said control means and said antenna assembly.

The measuring and phase adjusting process may be performed when the system is initially switched on, when the angle of electrical tilt is required to be changed and/or periodically to compensate for thermal fluctuations in the feeder lines, for example every 10 minutes.

In one embodiment, the phase compensation means include first and second mixer assemblies arranged at opposite ends of the first and second feeder lines.

Alternatively, the phase compensation means include a phase measuring receiver module.

In an alternative embodiment, the apparatus may include phase compensation means for independently measuring, for a plurality of operator frequency bands, a transmit path phase difference measurement derived from the difference in phase difference between signals supplied to the antenna elements along a transmit path, and including feedback means for feeding back said transmit path phase difference measurements to the control means. The control means preferably include means for adjusting the phase of signals supplied to the first and second feeder lines for each of said operator frequency bands independently in dependence upon the respective transmit path phase difference measurement, thereby to permit differences in said phase difference in different operator frequency bands to be compensated for.

For an antenna designed to transmit one polarisation of signals only, the transmit path typically includes the first and second feeder lines for supplying transmit signals from the combiner means to the antenna assembly, and first and second respective carrier lines, forming part of the antenna assembly, providing a means of connection between the first and second feeder lines and the antenna elements.

The apparatus may further comprise a Vector Measuring Receiver Module in the antenna assembly and may include means for extracting a portion of said signals supplied to the antenna elements and means for combining said extracted portion with an oscillator signal having a frequency dependent upon a selected operator frequency band, thereby to determine the transmit path phase difference measurement for each operator frequency band.

Preferably, the Vector Measuring Receiver Module includes first and second phase comparator units to enable in-phase and quadrature phase difference measurements to be obtained, thereby to determine an unambiguous measurement of the phase difference.

In a further preferred embodiment, the apparatus may include phase compensation means for measuring, for a plurality of operator frequency bands, a receive path phase difference measurement derived from the difference in phase difference between signals received at the antenna elements and transmitted along a receive path to the control means, and feedback means for feeding back said receive path phase difference measurements to the control means, and wherein said control means includes means for adjusting the phase of signals supplied to the first and second feeder lines for each of said operator frequency bands in dependence upon the respective receive path phase difference measurement, thereby to permit differences in said phase difference in different operator frequency bands to be compensated for.

This embodiment is particularly advantageous in the differences in phase difference between signals passing through the transmit path and signals passing through the receive path can be compensated for independently, and furthermore can be compensated for each operator frequency band independently.

The antenna assembly preferably includes oscillator means for generating a receive path calibration signal which is supplied through the receive path for the purpose of determining the receive path phase difference measurement in addition to the transmit path phase difference measurement.

Preferably, the receive path includes the first and second feeder lines of the transmit path and the first and second carrier lines of the transmit path also, but receive signals pass typically pass through different amplifier and filter components to the transmit signals.

In a preferred embodiment, the oscillator means is a tone generator for generating a tone signal to be supplied through the receive path.

For a selected operator frequency band, the tone signal preferably has a frequency intermediate between adjacent operator frequency bands, wherein one of the adjacent operator frequency bands is the selected operator frequency band.

Alternatively, the tone signal may fall within the selected operator frequency band.

Preferably, the oscillator means is arranged to transmit a receive path calibration signal in a bandwidth of around 200 Hz.

According to a second aspect of the invention, there is provided a phase compensation apparatus for use in an antenna assembly for multi-operator use having a plurality of antenna elements, each operator transmitting and/or receiving signals within a different operator frequency band, the apparatus comprising:

control means for controlling electrically the phase of signals transmitted and/or received by said antenna assembly, thereby to control an angle of electrical tilt of said antenna assembly;

means for measuring, for a plurality of operator frequency bands, a transmit path phase difference measurement derived from the difference in phase difference between signals supplied along a transmit path having first and second feeder lines to the antenna elements, means for measuring, for a plurality of said operator frequency bands, a receive path phase difference measurement derived from the difference in phase difference between signals supplied along a receive path from the antenna elements to the control means, and feedback means for feeding back said transmit and receive path phase difference measurements to the control means, said control means including means for adjusting the phase of signals supplied to the antenna elements for each operator frequency band in dependence upon the transmit and receive path phase difference measurements for the associated operator frequency band.

According to a third aspect of the invention, there is provided a compensation method for an antenna assembly, for multi-operator use, having a plurality of antenna elements, each operator transmitting and/or receiving signals within a different operator frequency band, the method comprising:

controlling electrically the phase of signals transmitted and/or received by said antenna assembly, thereby to control an angle of electrical tilt of said antenna assembly;

measuring, for a plurality of said operator frequency bands, a transmit path phase difference measurement derived from the difference in phase difference between signals supplied along a transmit path having first and second feeder lines to antenna elements, measuring, for a plurality of said operator frequency bands, a receive path phase difference measurement derived from the difference in phase difference between signals supplied along a receive path, including the first and second feeder lines, from the antenna elements, feeding back said transmit and receive path phase difference measurements to the control means, and adjusting the phase of signals supplied to the antenna elements for each of said operator frequency bands in dependence upon the respective transmit and receive path phase difference measurements, thereby to permit differences in said phase differences for different operator frequency bands to be compensated for.

It will be appreciated that the preferred and/or optional features of the phase compensation apparatus of the antenna system of the first aspect of the invention are equally applicable to the phase compensation apparatus of the second aspect of the invention, and likewise to the method of the third aspect of the invention.

According to a still further aspect of the present invention, an electrical tilt combiner apparatus for supplying signals to an antenna assembly includes a plurality of antenna elements, the electrical tilt combiner apparatus including;

control means for adjusting electrically the phase of signals to be transmitted by said antenna assembly, thereby to control an angle of electrical tilt of said antenna assembly; and combiner means for receiving said phase adjusted signals and permitting substantially simultaneous transmission of a first one of said signals at a first angle of electrical tilt and a second one of said signals at a second angle of electrical tilt.

It will be appreciated that features described as optional and/or alternatives of the first aspect of the invention are also applicable, singly or in combination, to the further aspect of the invention also.

For the purpose of this specification, the term 'phase delay or shift' has been used as a convenience of representation. Time delay may be achieved by changing the phase of the radio frequency carrier. Providing phase shift is proportional to the frequency across a band, and has zero intercept distortion, phase shift produces a substantially distortionless time delay. Phase shift and time delay are thus synonymous.

It will be appreciated that, for all aspects of the invention, in practice it may be desirable to transmit more than two of said signals at differing angles.

DESCRIPTION OF THE FIGURES

The present invention will now be described, by way of example only, with reference to the accompanying drawings in which:

FIG. 7b shows the frequency responses of filters used in the transmit combiner network of FIG. 7a;

DESCRIPTION OF A PREFERRED EMBODIMENT

In the following description, the invention is described in the context of an antenna system suitable for use in a cellular mobile radio network and particularly the Universal Mobile Telephone System (UTMS). However, it will be appreciated that the invention is not confined to such use and may be equally applicable to other communications systems.

Figure 1:
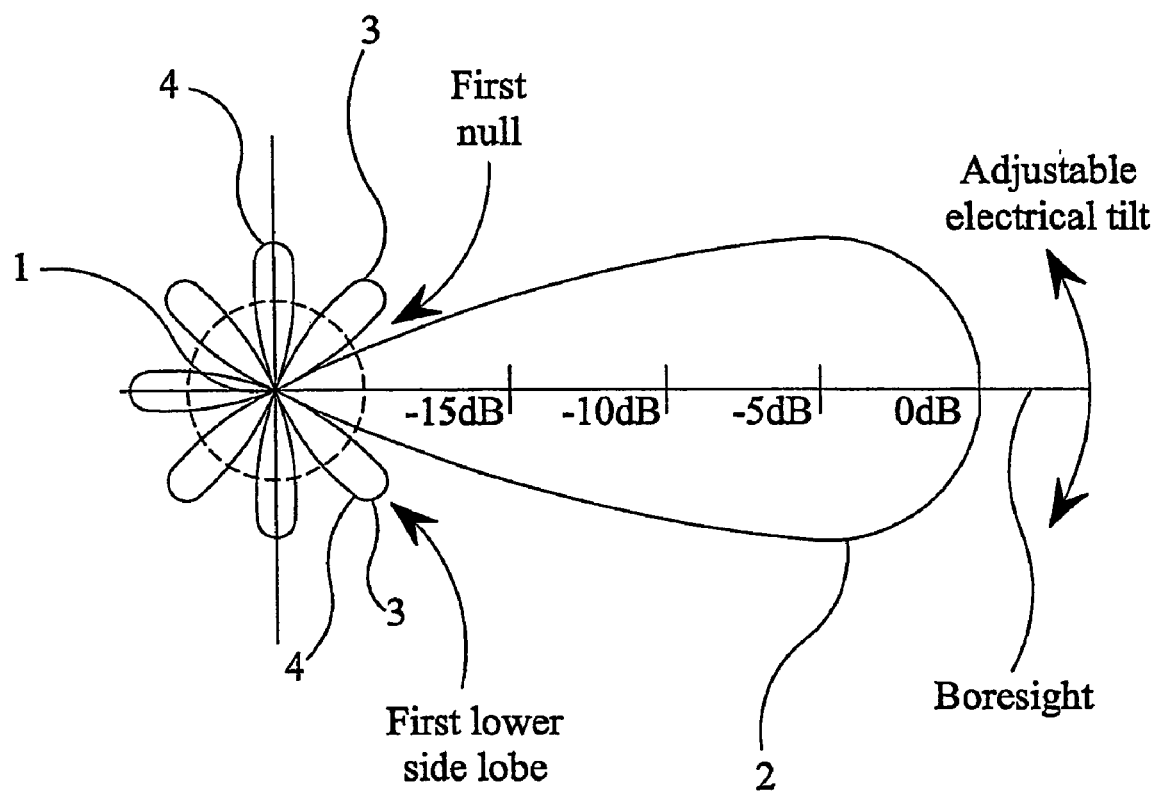
FIG. 1 illustrates the vertical radiation pattern (VRP) of a known phased array antenna assembly.

FIG. 1 shows the vertical radiation pattern (VRP) of a conventional phased array antenna assembly. The drawing is shown in side view and the antenna assembly is represented by the point 1.

The VRP of the antenna assembly 1 consists of a main lobe or "boresight" 2 which diverges in a vertical plane as it extends from the antenna assembly and represents the region of maximum radiation intensity of the beam radiated by the antenna assembly. The VRP of the antenna assembly also includes a number of side lobes 4, representing regions of much lower radiation intensity, which extend from the antenna assembly in directions which are approximately equiangularly spaced about the antenna assembly in a vertical plane. The lobes 3 immediately adjacent the boresight 2 are termed the first upper and first lower side lobes respectively.

The angle of tilt of the antenna assembly, when adjusted mechanically by physically moving the antenna elements and/or their housing or casing, is known as the angle of "mechanical tilt" and is conventionally achieved by repositioning the boresight so that it points either above or below the horizon. When adjusted electrically, the tilt of the antenna assembly is known as "electrical tilt" and moves the boresight line up or down by changing the time delay of signals supplied to groups of elements in the antenna, rather than by mechanical movement of the elements themselves.

It will benefit the reader's understanding of the following description to note that both "electrical tilt" and "mechanical tilt" may be controlled and/or adjusted either by electrical means, or by mechanical means, or by both means, such that, for example, mechanical movement of parts may be used to implement electrical phase adjustment (in which the antenna elements themselves are not physically moved) so as to adjust the position of the boresight.

Figure 2:
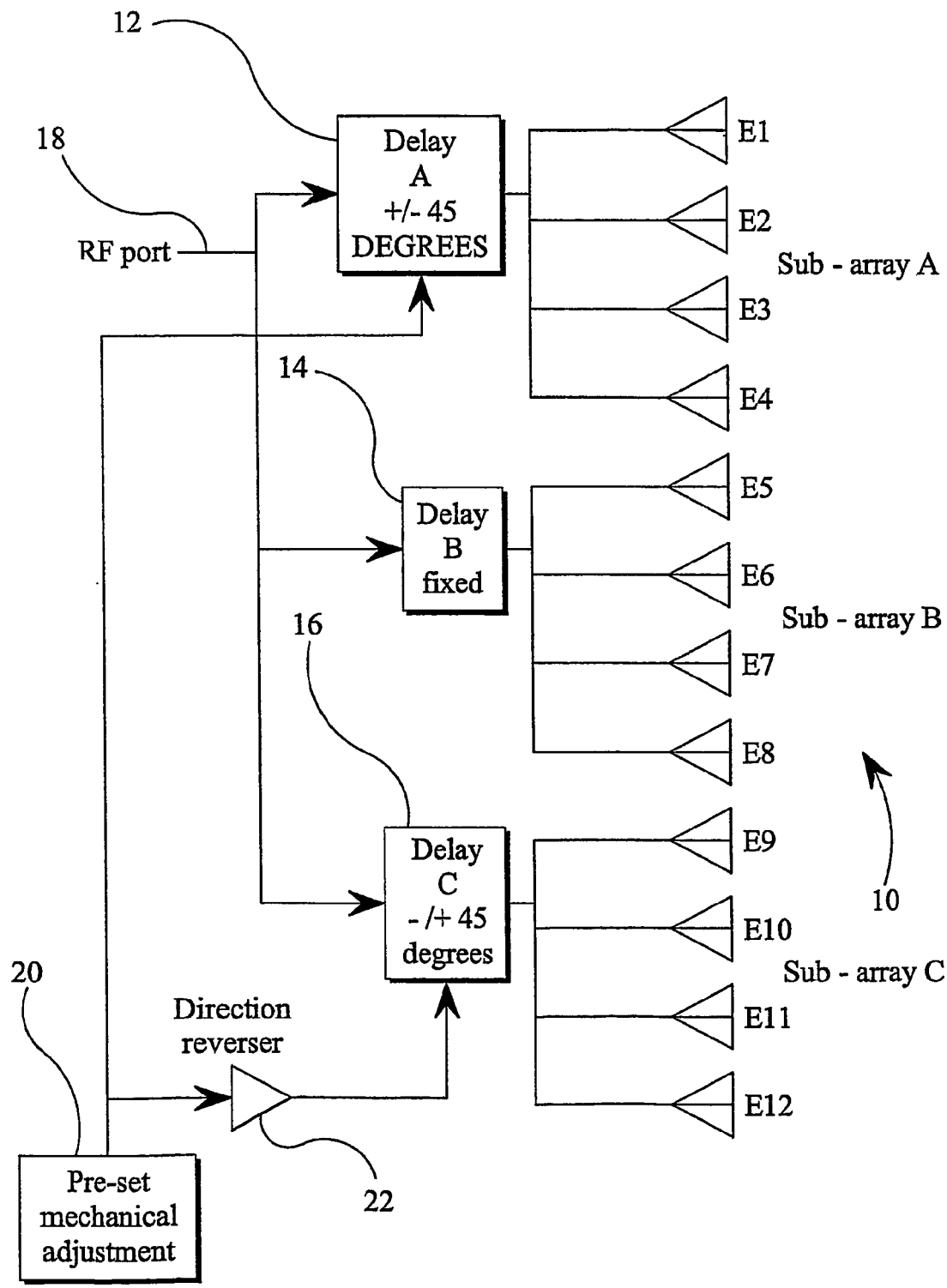
FIG. 2 is a schematic block diagram of a known antenna assembly incorporating mechanical means for adjusting the angle of electrical tilt.

In FIG. 2, the antenna assembly of a known antenna system incorporating an electrical tilt adjustment arrangement is shown in schematic block form generally at 10. The antenna assembly is a phased array antenna consisting of an array of twelve elements or dipoles E1 to E12 which are arranged into three sub-arrays labelled A, B and C. Each sub-array A, B, C includes four elements, mutually connected in parallel, and is coupled to the output of respective first, second and third delay devices 12, 14, 16. The delay devices 12, 14, 16 comprise conventional mechanical phase adjustment mechanisms for adjusting the phase of signals supplied to the sub-arrays. A radio frequency (RF) signal to be transmitted by the antenna is supplied to each of the delay devices 12, 14, 16 from a common RF port or feeder 18.

The function of the delay devices 12, 14, 16 is to adjust the phase of the RF signal supplied to the respective sub-array A, B, C by a predetermined amount. The second delay device 14, connected to the centre sub-array B, is a fixed delay device, arranged to shift the phase of the signal supplied to sub-array B by a fixed amount. On the other hand, the first and third delay devices 12, 16, connected to sub-arrays A and C respectively, are variable delay devices, each of which is operable to shift the phase of the RF signals supplied to sub-arrays A and C respectively, by a variable amount.

The first and third delay devices 12, 16 can apply phase shifts of, typically, between 0 and ±45° to the RF signal supplied to sub-arrays A and C and each is adjustable by means of a mechanical adjustment arrangement. The mechanical adjustment arrangement 20 includes means, shown representatively at 22, for reversing the direction of the phase shift applied to the signal by the third delay device 16 compared with that applied by the first delay device 12. Thus, the phase shift applied to the RF signals by the first and third delay devices 12, 16 is equal in magnitude but opposite in polarity. In other words, if the first delay device 12 shifts the phase of the signal supplied to sub-array A by +45°, then the third delay device 16 shifts the phase of the signal supplied to sub-array C by −45°. As the second delay device 14 is a fixed delay device, in practice a phase shift is applied to the signal supplied to sub-array B which is the median of the shifts applied by the first and third delay devices 12, 16.

The angle of electrical tilt of such an antenna assembly typically varies by ±5° for ±45° of phase shift per sub-array. This gives a tilt sensitivity of approximately 18° of phase shift per degree of electrical tilt. In this example, therefore, since the RF signals supplied to sub-arrays A and C differ by 90°, the electrical tilt of the antenna assembly is approximately 5°. The direction of electrical tilt of the antenna assembly depends on the polarity of the phase shift applied to the signals supplied to the sub-arrays. Where the signal to the upper sub-array (in this case sub-array A) has a positive phase and the lower sub-array (in this case sub-array C) has a negative phase shift, the angle of electrical tilt will be positive, i.e. above the normal boresight line. For phase shifts of opposite polarity the angle of electrical tilt will be negative.

The antenna assembly of FIG. 2 suffers from the disadvantage that manual adjustment of the mechanical adjustment arrangement 20 is required to adjust the phase shift applied by the first and third delay devices 12, 16 in order to vary the angle of electrical tilt of the antenna assembly. Moreover, the phase of signals supplied to each antenna element cannot be adjusted individually.

Figures 3, 4:
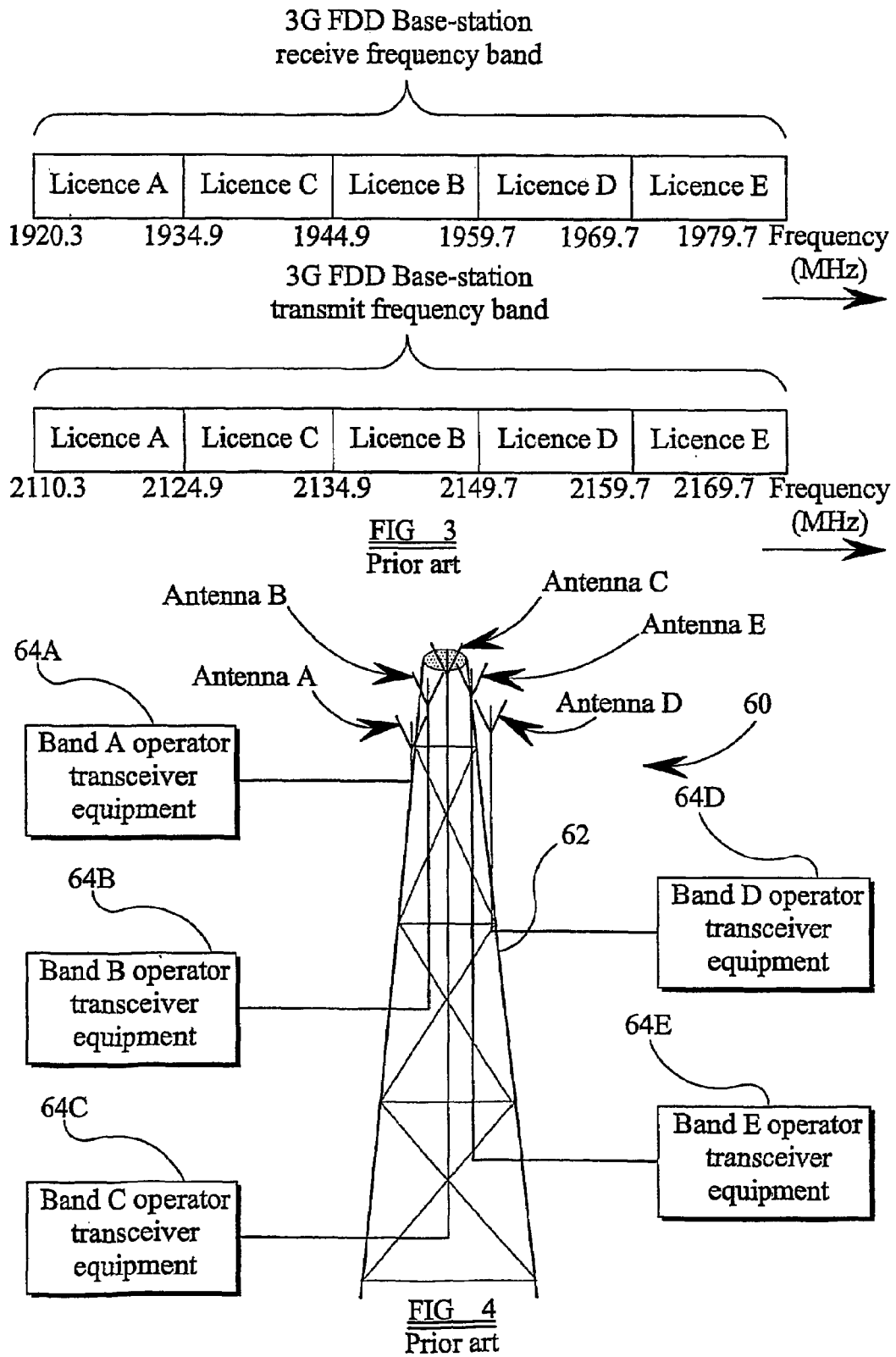
FIG. 3 illustrates a known third generation (3G) frequency division duplex base station frequency allocation.
FIG. 4 illustrates a known base station mast sharing arrangement.

FIG. 3 shows the Third Generation Frequency Division Duplex (3G FDD) frequency bands allocated by the United Kingdom (UK) Radiocommunications Agency for use by the UK 3G network operators. Each of the five UK operators is licensed to use a first specific portion, or sub-band, of the allocated spectrum for transmission, for example from a base station to a mobile radio within the network, and another such portion for reception, for example from a mobile radio to a base station. These sub-bands are labelled Licences A, B, C, D and E. The total spectrum extends from 2110.3 MHz to 2169.7 MHz for base station transmission and from 1920.3 MHz to 1979.7 MHz for base station reception. Although there are unallocated frequencies known as guard bands (not shown) at the boundaries of these frequency ranges, there are no gaps between the individual sub-bands A, B, C, D and E which are therefore contiguous.

Owing to the problems associated with the sharing of a common antenna by network operators using adjacent sub-bands, the sharing of base-stations is often achieved by means of the architecture illustrated in FIG. 4. The architecture 60 permits five network operators to share a base-station site with a respective transmit/receive antenna being provided for each operator per sector. The result is a total of five antennas (Antennas A, B, C, D and E) for each sector which are mounted upon a common base-station mast 62, with each antenna being mounted on the mast 62 at a different height, or at the same height and adequately spaced. Each antenna has a respective transceiver apparatus 64A to 64E. The height of the mast 62 must be greater than that required for a single antenna in order to accommodate the five antennas. As a consequence, the strength of the mast 62 must be increased, for example to enable the mast to withstand high winds, which in turn increases the weight and cost of the mast. Furthermore, not all sites are able to accommodate a larger mast and difficulties are often experienced in obtaining planning permission from local authorities. Large masts are also unsightly and obtrusive and may be environmentally unacceptable at some sites.

Figure 5:
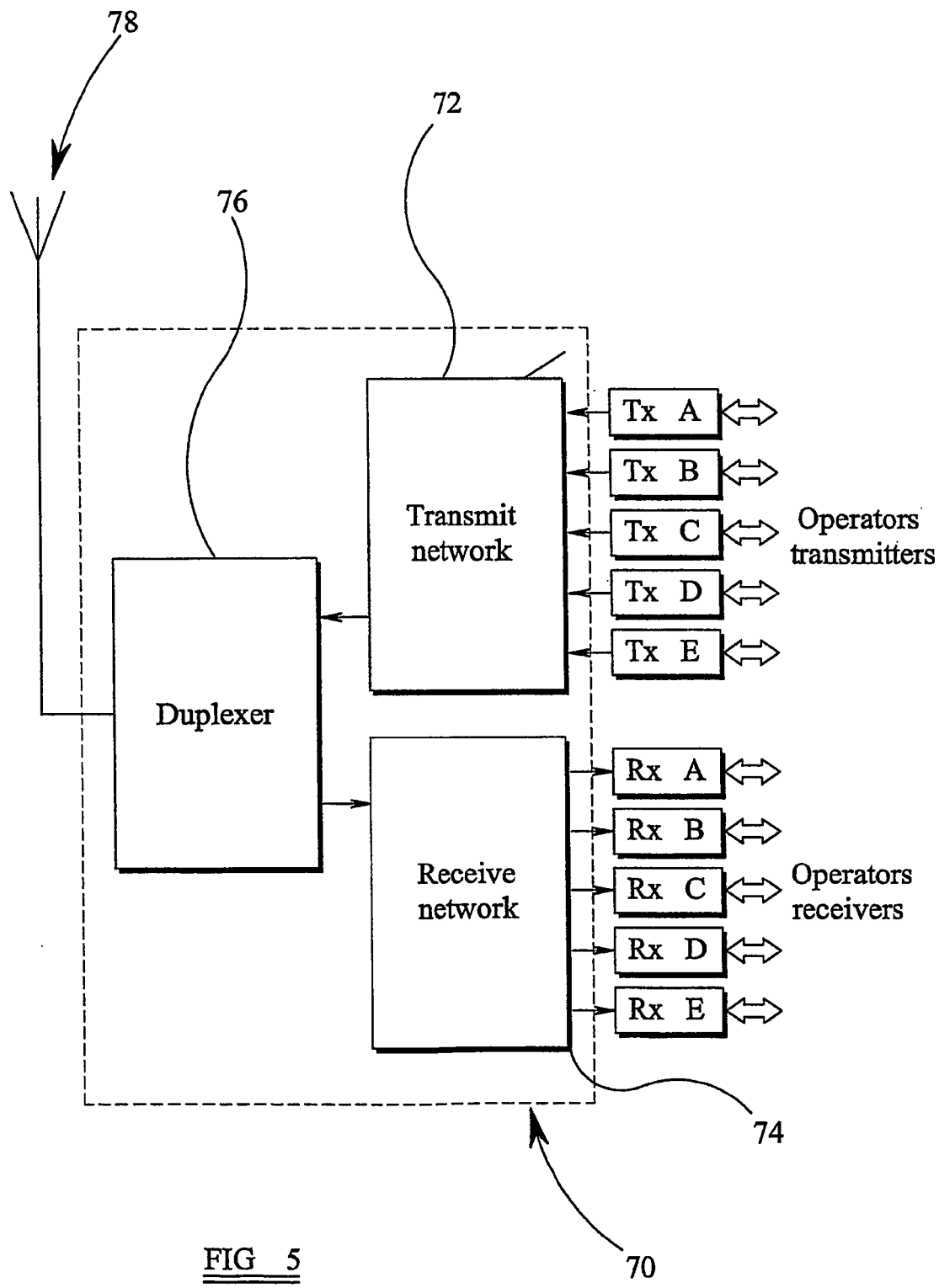
FIG. 5 illustrates a proposed antenna system in accordance with a first aspect of the invention, involving the sharing of a single dual polarity antenna assembly by up to five operators.

FIG. 5 shows a proposed combiner unit, for reducing the number of antennas required to support five network operators from five to one. The combiner unit, shown generally at 70, comprises a transmit combiner network 72, a receive splitter network or demultiplexer 74 and a duplexer unit 76. The five network operators have respective transmitters TxA to TxE, connected to the transmit combiner network 72, and receivers RxA to RxE, connected to the receive splitter network 74. The networks 72, 74 are connected via the duplexer unit 76 to a shared antenna assembly 78.

The transmitters TxA to TxE generate RF signals which are combined in the transmit combiner network 72 and passed through the duplexer unit 76 to the antenna assembly 78 for transmission. Signals received by the antenna assembly 78 from remote mobile radios (not shown) are fed from the antenna assembly 78, through the duplexer unit 76, to the receive splitter or demultiplexer network 74.

Figure 6:
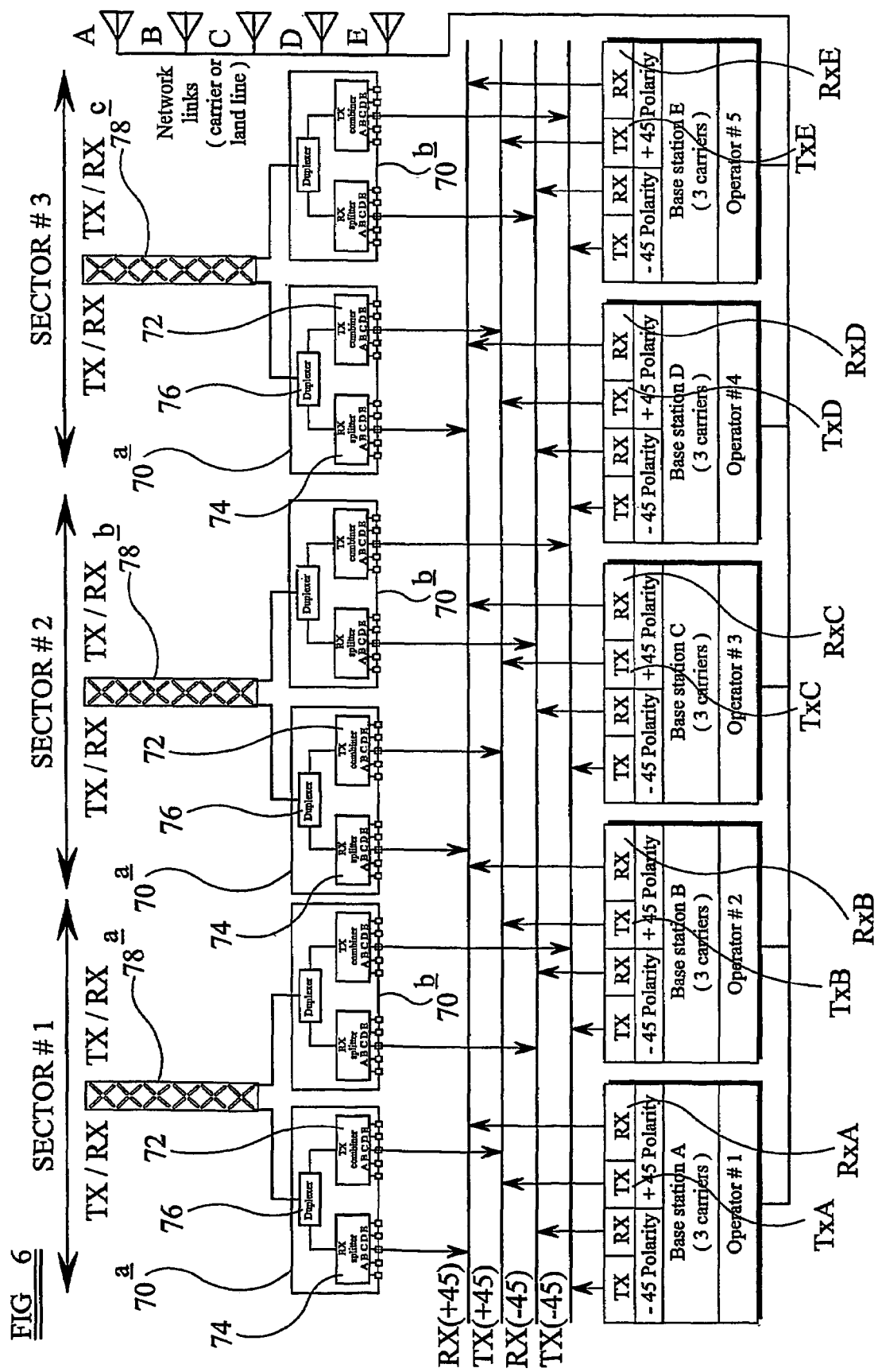
FIG. 6 illustrates a dual polarity, three sector antenna system incorporating three of the antenna systems of FIG. 5.

In FIG. 6, the architecture of FIG. 5 is extended to include three separate antenna assemblies 78a, 78b, 78c to form a so-called "Three Sector Antenna Assembly", where each antenna assembly is arranged to provide horizontal cell coverage over 120 degrees of arc (or one third of a circle) such that, together, the antenna assemblies 78a, 78b, 78c provide cell coverage over a full 360 degrees. In this embodiment, each antenna assembly 78a, 78b, 78c is a dual polarity antenna assembly. The use of dual polarity antenna assemblies is well known and common in cellular radio systems. Each antenna assembly 78a, 78b, 78c consists of a stack of crossed dipole elements, a first array of elements angled at +45° to the vertical and a second array of elements angled at −45° to the vertical. The arrays for each polarity are effectively electrically separate with individual combiner units 70a, 70b being provided for each array. Each antenna assembly is thus connected to a respective first and second combiner unit 70a, 70b, having the form of the combiner unit 70 in FIG. 5. The combiner units 70a, 70b are identical for both polarities, as are the connections thereto from the operator transmitters and receivers.

Considering, for clarity, only the positive polarity components of the system, each of the transmitters TxA to TxE of the network operators is connected to a respective input of each of the transmit combiner networks 72 in the three positive polarity combiner units 70a, 70b, 70c. Signals supplied from the transmitters are passed from the transmit combiner network 72 through the duplexer unit 76 to the respective antenna assembly 78a, 78b, 78c for transmission.

Similarly, each of the receivers RxA to RxE of the network operators is connected to a respective output of each of the receive splitter networks 74 in the three positive polarity combiner units 70a, 70b, 70c. Signals received by an antenna assembly 78a, 78b, 78c are passed through the associated duplexer unit 76 to the receive splitter network 74 which splits the received signal into five equal parts and applies it to the receivers RxA to RxE.

The negative polarity components of the system are connected in a similar manner. It can therefore be seen that five operators are able to use the system simultaneously, requiring only one antenna assembly where an omnidirectional antenna assembly is employed or three antenna assemblies where a three sector system is used. Previous systems required five separate antenna assemblies per sector or fifteen antenna assemblies for a three sector system.

The combiner unit 70 of FIG. 5 can suffer from a number of drawbacks. Firstly, the transmit combiner network 72 may include components which introduce significant signal losses into the system. These signal losses reduce the transmission range of the system. Amplifiers may be added to remedy the signal loss but these suffer from an inability to handle the power required for transmission on all five frequency bands simultaneously with adequate linearity, instantaneous bandwidth and efficiency together with the required reliability.

The introduction of band pass filters into the transmit combiner network 72 to reduce the power output required by the amplifier has been suggested, in which the transmit combiner network 72 has an assembly of five parallel band-pass filters acting in combination as a transmit multiplexer. The band-pass filters filter the signals from the respective transmitters TxA to TxE, after which the signals are multiplexed to a common output line and routed to the duplexer unit 76 and antenna assembly 78. The pass band of each filter is selected to be as close as possible to the frequency band licensed to the respective operator. Such an arrangement does, however, further increase signal loss in the system, owing to the shallow roll-off of most band pass filters and the resulting overlapping of the sub-bands, and reduces isolation between the transmitters TxA to TxE.

Figure 7A:
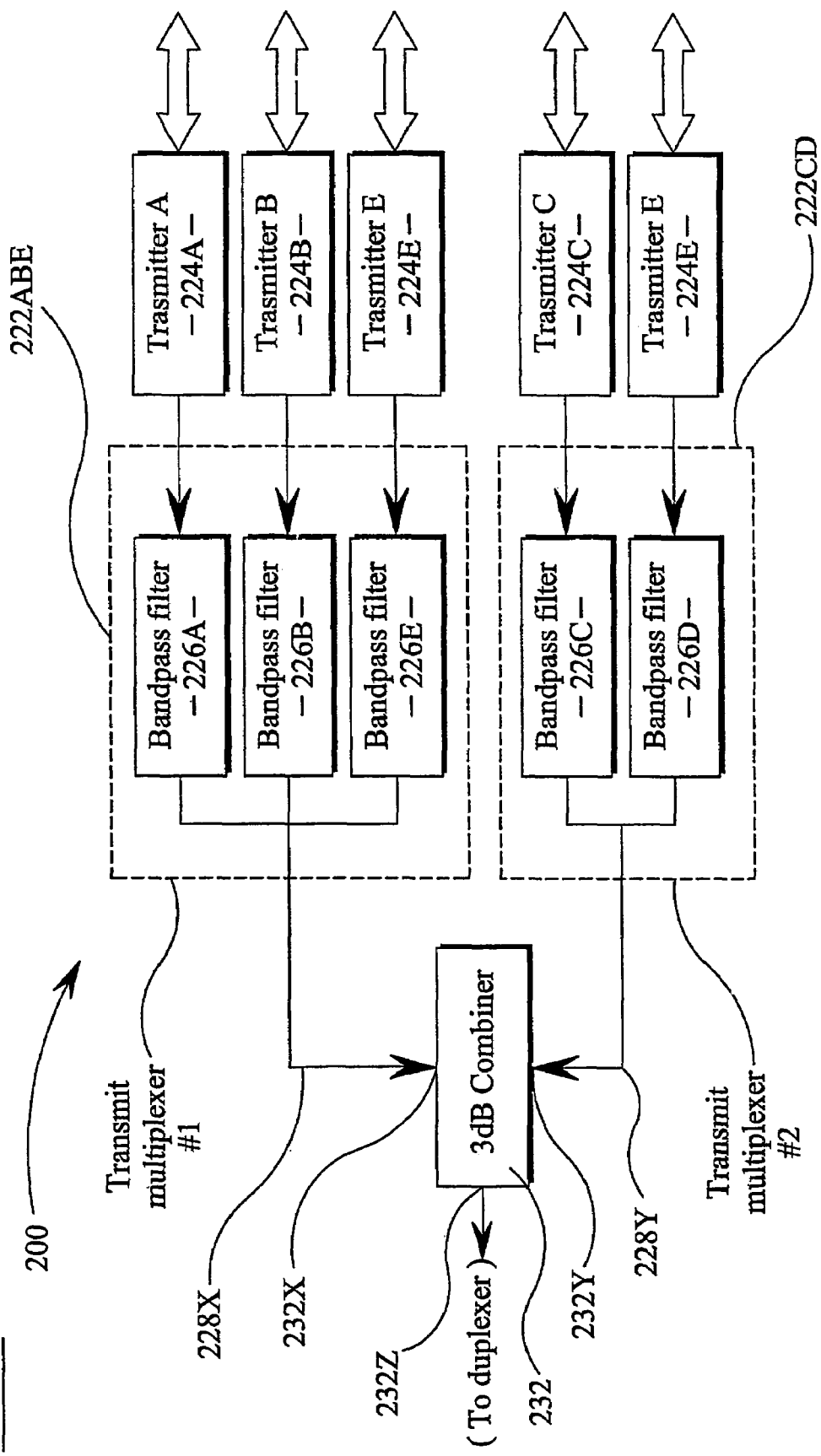
FIG. 7a is a block diagram of a proposed transmit combiner network for use in the antenna systems of FIGS. 5 and 6.

In FIG. 7a an improved transmit combiner network, for use in the combiner units shown in FIGS. 5 and 6, is shown generally at 200. The transmit combiner network 200 incorporates first and second transmit multiplexers 222ABE and 222CD. The first transmit multiplexer 222ABE is arranged to receive transmission signals from up to three transmitters 224A, 224B, 224E and filter them in respective band-pass filters 226A, 226B, 226E. The second transmit multiplexer 222CD is arranged to receive transmission signals from up to two further transmitters, 224C and 224D, and to filter them in respective band-pass filters 226C, 226D.

Filtered output signals from the band-pass filters 226A, 226B, 226E are combined at a first filter output (combined output signal 228X) and those from band-pass filters 226C, 226D are combined at a second filter output (combined output signal 228Y). Signals 228X, 228Y from the filter outputs are combined in a two-input 3 dB passive combiner 232 having two input ports 232X, 232Y and an output port 232Z. The combined output signal from the output port 232Z is then fed, as shown in FIG. 5, via the duplexer unit 76 to the associated antenna assembly 78.

Figure 7B:
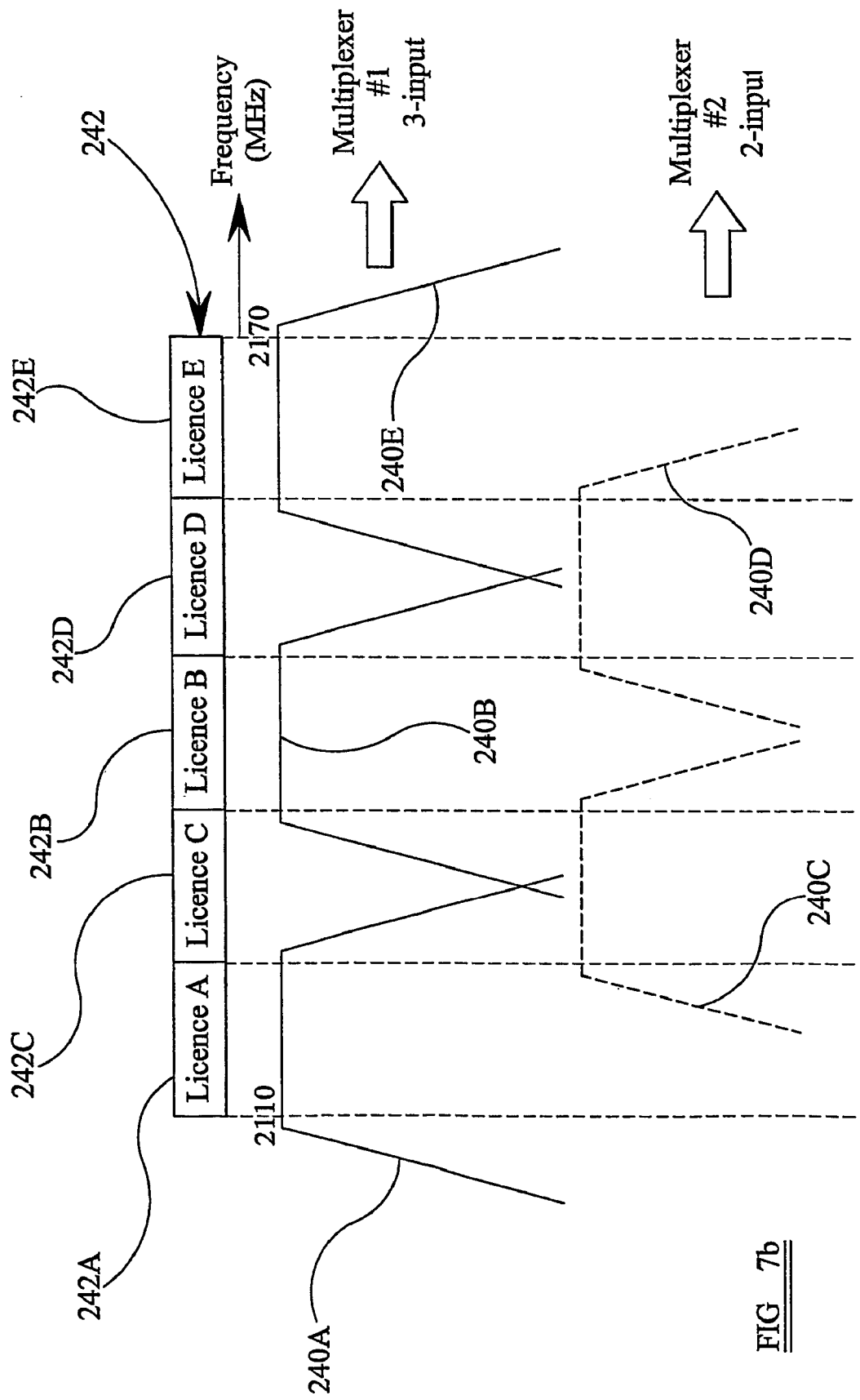

Referring now also to FIG. 7b, respective pass-bands 240A to 240E of the five filters 226A to 226E are as shown. The pass-bands 240A to 240E have the same nominal maximum (although pass-bands 240C and 240D are shown lower relative to the others for clarity) and it can be seen that the bandwidths are not equal. As shown on a frequency scale 242, five licensed frequency bands 242A to 242E comprise frequency band 242C immediately adjacent frequency bands 242A and 242B, and frequency band 242D immediately adjacent frequency bands 242B and 242E. This results in two groups of non-adjacent frequency pass-bands 242A/242B/242E and 242C/242D, which, as shown in FIG. 7a, are associated with different transmit multiplexers 222ABE and 222CD respectively.

Because the filter pass-bands in each transmit multiplexer 222ABE or 222CD are separated by stop-bands which preclude significant pass-band overlap, signals 228X output from filter 226A, for example, will only reach transmitters 224B and 224E, via filters 226B and 226E, in highly attenuated form and will be negligible for most purposes. The same applies to coupling between other pairs of transmitters within an individual transmit multiplexer, 222ABE or 222CD, and therefore to filters 226A to 226E. The attenuation provided by the filters 226A to 226E isolates transmitters from other signals at the outputs from which signals 228X or 228Y are generated, as appropriate, and consequently at these outputs the signals 228X or 228Y are "perfectly combined". The expression "perfectly combined" is intended to mean that, because the pass-bands of the respective filters do not overlap, the electrical impedance of multiplexers 222ABE and 222CD over the filter pass-bands remains substantially constant. This allows input signals from transmitters 224A to 224E to pass through a multiplexer 222ABE or 222CD to provide an output signal 228X or 228Y with minimal distortion ("perfect"), so performing the desired combining function. When filter pass-bands overlap, pass-band impedance is not constant, hence signals appearing at a multiplexer output are distorted ("imperfect"). To combine the two signals 228X and 228Y while inhibiting undesirable interactions between transmitters 224A to 224E, the combiner 232 is used. The combiner is a two-input 3 dB passive wideband component and it provides good signal isolation of at least 20 dB between its two input ports 232X and 232Y, irrespective of the frequency separation of signals at these ports. It allows signals which are adjacent in frequency to be combined without allowing appreciable unwanted transmitter coupling between them. Hence, signal groups at 228X and 228Y are combined in a linear fashion, without an unacceptable degree of mutual interaction, and appear at the output of combiner 232 as a substantially perfectly combined continuous frequency spectrum.

Although there is an inherent signal loss between the input and output ports 232X to 232Z of the combiner 232, this is significantly less than the loss imposed by a transmit combiner network which relies entirely on passive waveband components. The two-stage combining approach described with reference to FIG. 7a provides a more efficient passive transmitter combining network than conventional architectures, and avoids the need for a linear multi-carrier power amplifier.

The arrangement therefore allows operators in both adjacent and non-adjacent transmit bands to share a base station antenna assembly. Expensive multi-frequency power amplifiers are not necessary because the transmit combiner network 200 has reduced losses compared to that shown in FIG. 5. In addition, the arrangement avoids the overlapping filter pass-bands inherent in the transmit combiner network 72 of FIG. 5.

The minimum number of transmit signals which could be used in an arrangement similar to the transmit combiner network 200 in FIG. 7a is two, the two signals being connected via respective separate filters to the 3 dB passive combiner 232. If there are only two transmitters in adjacent frequency bands there is no need to multiplex transmit signals together in a multiplexer such as 222CD before feeding to the combiner 232. If there are two signals which are non-adjacent in frequency, they can be combined using one multiplexer 222 and fed directly to a duplexer without passing through a combiner such as 232, thus reducing signal loss. With three transmit signals, where at least two are in adjacent bands, two would be combined in multiplexer 222 and the third would be fed directly to combiner 232. If, however, the three non-adjacent frequency bands A, B and E were to be combined, only one multiplexer 222ABE would be required and its output 228X would be fed directly to the duplexer without passing through combiner 232. Four or more signals requires two groups of two or more non-adjacent signals, each group to be multiplexed together before combining with the other group. When combining fewer than five transmitters, any unused inputs to multiplexers 222 would normally be terminated in a load. Alternatively, unused frequency filters 226 could be omitted from the multiplexer, thereby reducing cost, size and weight.

The transmit combiner network 200 is described in more detail in co-pending Patent Application Serial No. 0108456.5, the contents of which are incorporated herein by reference.

The antenna system of FIG. 6 allows up to five network operators to share a common antenna assembly. However, as described above, there is a need for an antenna system which not only allows several network operators to use a common antenna assembly substantially simultaneously, but also provides the ability for independent electrical adjustment of the angle of electrical tilt of the antenna assembly by each operator, and preferably from a location remote from the antenna assembly itself.

Figure 8A:
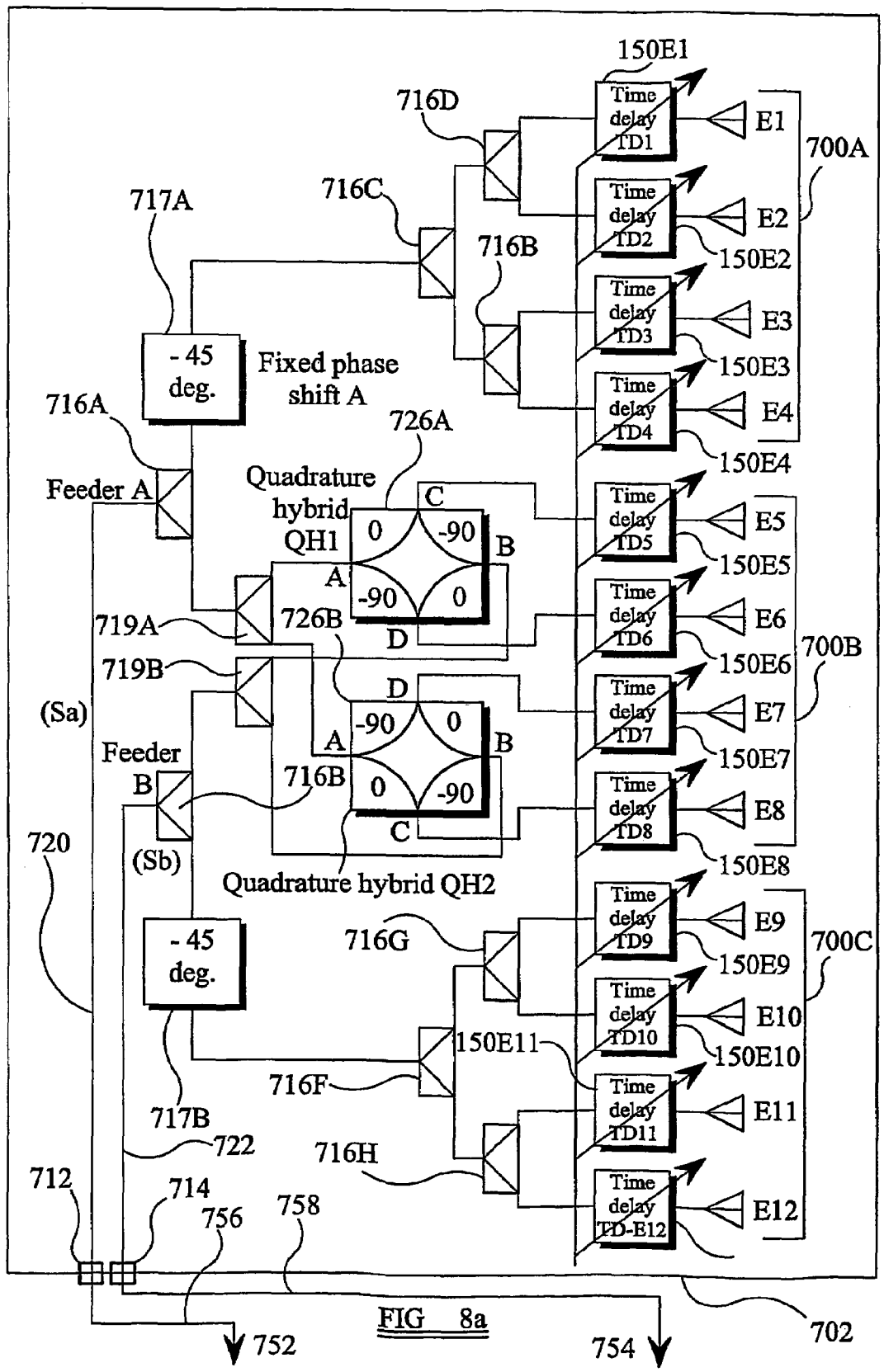
FIG. 8 is a block diagram of a preferred form of antenna system according to the invention (for one operator)
Figure 8B:
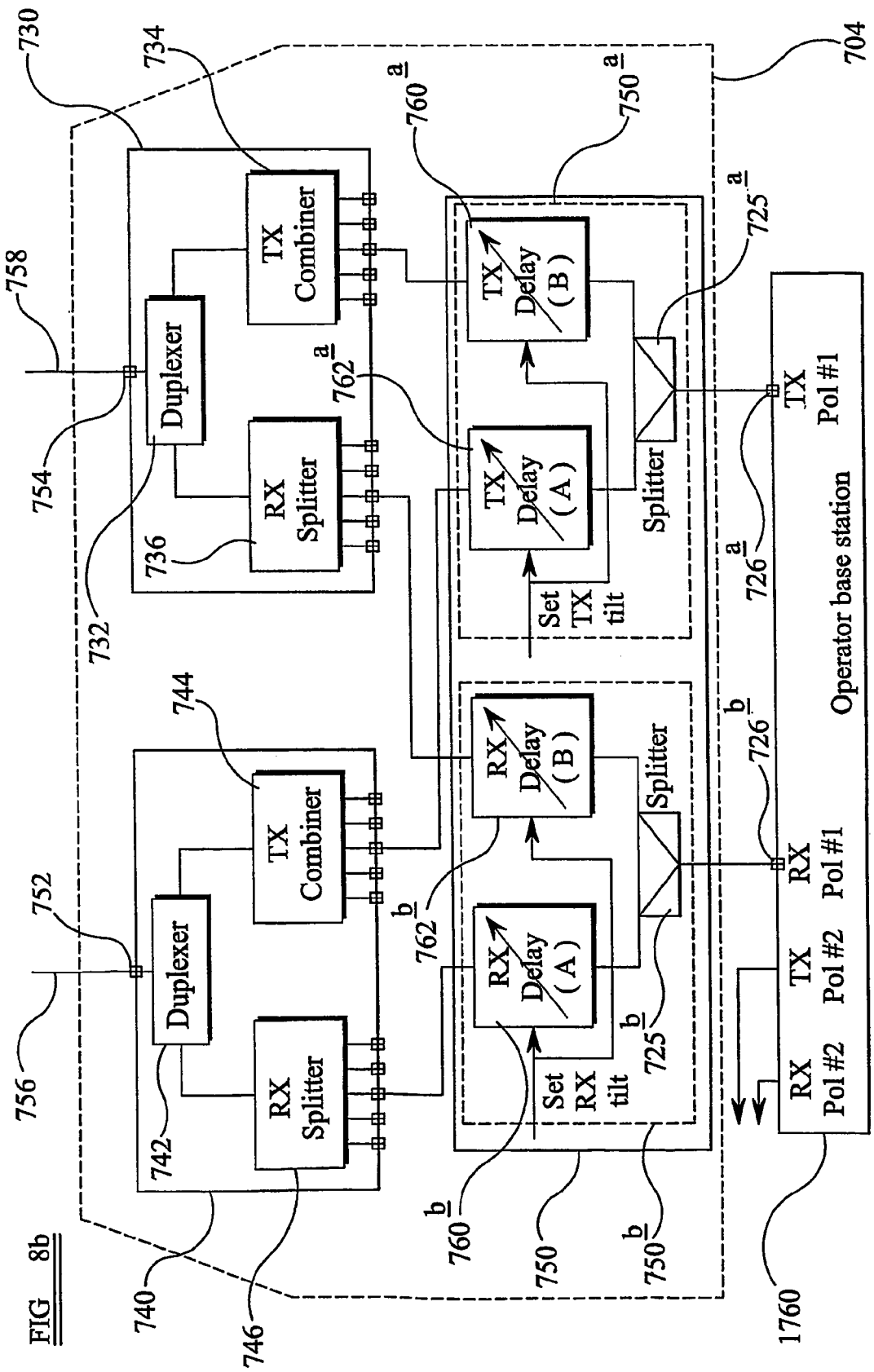

In FIG. 8, a preferred form of antenna system according to the invention is shown in block form generally at 700. In this embodiment, the antenna system 700 comprises an antenna assembly 702 having a total of twelve antenna elements E1–E12 arranged into three sub-arrays 700A (E1–E4), 700B (E5–E8) and 700C (E9–E12). The angle of electrical tilt of the assembly 702 may be adjusted by control means in the form of a Tilt Combiner Unit (TCU), as represented by the dashed line 704 and described in further detail below.

First and second input signals, Sa and Sb, for transmission by the antenna assembly 702 are delivered to the antenna elements E1–E12 through first and second input carrier lines 720, 722 respectively. The antenna assembly 702 includes first and second primary splitter units 716A, 716B fed by a respective one of the first and second input carrier lines 720, 722. Each of the splitter units 716A, 718B produces two output signals of substantially equal strength/power. A first output signal from the first splitter unit 716A is supplied to a phase shift unit 717A to apply an additional phase shift, typically between −45 and −60 degrees, to the signal from the primary splitter unit 716A. The phase shifted output signal is provided to a further splitter unit 716C, which serves to split the input signal it receives into two signals of substantially equal strength. The two output signals from the further splitter unit 716C are supplied to a respective additional splitter unit 716D, 716E, each of which splits the signal it receives into two output signals of substantially equal strength. The output signals from the additional splitter units 716D, 716E are fed to a respective one of the elements E1 to E4 of the first sub-array 700A. Each element E1 to E4 has an associated phase adjustment arrangement, 151E1, 151E2, 151E3, 151 E4 respectively, to provide an additional and individual means of adjusting the phase shift of signals supplied to each element, as described further below. In receive mode, signals are combined onto the first and second carrier lines by a reverse path through the same devices.

It will be appreciated from the foregoing description that the splitter arrangement 716A, 716C, 716D, 716E is configured such that each of the output signals to the elements E1 to E4 of the first sub-array 700A receives a signal of substantially equal strength.

A second output from the splitter unit 716A is provided to a further splitter unit 719A, which splits the input it receives into a first output signal which is provided to one input (A) of a first quadrature hybrid combiner unit 726A and a second output signal which is provided to an input (A) of a second quadrature combiner unit 726B.

The second splitter unit 716B provides a first output signal to a further splitter unit 719B, which splits the input it receives into two signals of substantially equal strength, one of which is provided to a second input (B) of the first quadrature combiner unit 174A and the other of which is provided to a second input (B) of the second quadrature combiner unit 174B.

Each of the first and second quadrature combiner units 726A, 726B provides first and second output signals to two elements of the centre sub-array 100B: the first quadrature combiner unit 726A provides signals to elements E5 and E6 and the second quadrature combiner unit 726B provides signals to elements E7 and E8. The first and second quadrature combiner units 726A, 726B ensure the phase of signals provided to elements E5 to E8 is the average of the phase of the signals on the input carrier lines 720, 722. For example, as the power fed to element E5 decreases, the power fed to element E6 increases so that the total power fed to the elements E5, E6 remains substantially constant.

A second output signal from the second splitter unit 716B is passed through a second phase shift unit 717B, which applies a phase shift of +45 degrees (i.e. opposite polarity to phase shift unit 717A) to a splitter unit 716F. The splitter unit 716B splits the input signal it receives into two output signals of substantially equal strength, which in turn are split into two further signal by further splitter units 716G, 716H. The four output signals from splitter units 716G, 716H are provided to a different one of the elements E9 to E12 of the third sub-array, through a respective additional phase adjustment arrangement 150E9 to 150E12.

The central sub-array 100B is thus fed by an arrangement of quadrature hybrid units, with the result that the power at the central sub-array is substantially 50% of the total array power in respect of both transmission and reception of signals. For the array as a whole, the phase of the signal generated on transmission will be the average of the phase supplied by the two input carrier lines 720, 722, with a −45 degree phase shift. Similarly, a signal received by the central sub-array 100B will be intermediate the phases received by the other two sub-arrays 100A, 100C, shifted by −45 degrees.

The input ports 712, 714 on the antenna assembly are each connected to an output port 752, 754 on the TCU 704 via respective feeder lines 756, 758. The TCU 704 includes first and second combiner units 730, 740, similar to the unit 70 shown in FIGS. 5 and 6, the output of each combiner unit 730, 740 being connected to the output ports 754, 752 respectively.

The TCU 704 also includes phase control means in the form of a differential phase control unit (DPCU), referred to generally at 750. The DPCU 750 comprises a transmit differential phase control sub-unit, denoted by the dashed line 750a, and a receive differential phase control sub-unit, denoted by the dashed line 750b. The transmit differential phase control sub-unit 750a comprises an input splitter unit 725a, an input to which is connected to the output of a single RF port 726a associated with the transmitter (not shown) of a first network operator 760. The input splitter unit 725a has two outputs, each of which is connected to an input of a respective first and second adjustable delay unit (hereafter referred to as a "transmit phase adjuster") 760a, 762a. Thus, the signal to be transmitted by each network operator is split into two equal power signals by the input splitter unit 725a, and these two signals are then subjected to a differential phase shift by means of the phase shifter networks 760a, 762a.

The first transmit phase adjuster 760a is connected at its output to one input of the transmit combiner network 734 in the first combiner unit 730. The second transmit phase adjuster 762a is connected at its output to one input of the transmit combiner network 744 in the second combiner unit 740.

The receive differential phase control sub-unit 750b comprises an output multiplexer unit 725b having two inputs and an output. The output of the output multiplexer unit 725b is connected to the input of a single RF port 726b associated with the receiver (not shown) of the first network operator 760.

Each of the two inputs of the output multiplexer unit 725b is connected to the output of a respective first and second adjustable delay unit (hereafter "receive phase adjuster") 760b, 762b. The first receive phase adjuster 760b is connected at its input to an output of the demultiplexer 746 in the second combiner unit 740. The second receive phase adjuster 762b is connected at its input to an output of the demultiplexer 736 in the first combiner unit.

In operation a signal to be transmitted by the antenna system 700 is fed from the RF port 726a of the first operator 760 at the base station to the input of the input splitter unit 725a. The input splitter unit 725a splits the signal into two output signals of equal strength and supplies one split signal to each of the first and second transmit phase adjusters 760a, 762a in the transmit differential phase control sub-unit 750a.

The first and second transmit phase adjusters 760a, 762a are operable by means of the network operator to apply a variable delay to the signal supplied thereto, thereby to adjust the phase of the signal within a range of ±45°. The transmit phase adjusters 760a, 762a are controlled differentially such that, if the first transmit phase adjuster 760a is arranged to apply a positive phase shift to the RF signal applied thereto, the second transmit phase adjuster 762a is arranged to apply a negative phase shift to the RF signal applied thereto, and vice versa. This arrangement has the advantage that the amount of delay variation required by each transmit phase adjuster is one half that required by an alternative arrangement where one delay device has a fixed value of delay and the other increases or decreases delay, relative to the fixed value. However, each transmit phase adjuster 760a, 762a is arranged to adjust the phase of the signal supplied thereto independently so that the magnitude of the phase shift applied by each transmit phase adjuster may be different if required.

The phase adjusted signal from the first transmit phase adjuster 760a is supplied to an input of the transmit combiner network 734 in the first combiner unit 730. Similarly, the phase adjusted signal from the second transmit phase adjuster 762a is supplied to an input of the transmit combiner network 744 in the second combiner unit 740. Each transmit combiner network 734, 744 supplies the phase shifted signals to the input of its associated duplexer 732, 742 which, in transmit mode, applies the signals to output ports 754, 752 respectively.

From the output ports, 752, 754, the phase adjusted signals are supplied, via the feeder lines 756, 758 respectively, to the input ports 712, 714 of the antenna assembly 702. In practice, the feeder lines 752, 754 can be made as long as desired so that the TCU 704 can be situated in a location remote from the antenna assembly 702, if required several kilometers away, for example.

From the input ports 712, 714, the phase adjusted signals are supplied on the input carrier lines 720, 722, as signals Sa and Sb respectively, to the first upper and lower sub-array splitter units 716A, 716B. From the first upper and lower sub-array splitter unites 716A, 716B, the signals Sa, Sb are split and distributed to the antenna elements E1 to E12, via one or more of the second to seventh upper and lower sub-array splitter units 716C to 716H, and from where they are transmitted as an electromagnetic signal to the mobile radios in the cell.

The manner in which the signals Sa, Sb are split and distributed to the elements E1 to E12 in the antenna assembly 702 will immediately be appreciated by those skilled in the art from the way in which the splitter units are interconnected and from the foregoing description. The arrangement of splitters units provides a good approximation to a linear phase front across the antenna when the antenna is electrically titled at the base station 1760. This is achieved through use of only two feeder lines, 756, 758 to give a relatively simple and cost effective tiltabel system.

FIG. 8 illustrates the apparatus when configured to transmit and/or receive signals having only a single polarisation (e.g. positive polarisation), although in practice negative polarisation signals will also be transmitted/received. For each polarisation, two feeder lines 756, 758 to the antenna assembly 702 and two respective carrier lines 720, 722 are provided. Thus the maximum number of feeder lines required for a dual-polarity antenna is four, making the apparatus relatively simple in design.

The difference in phase of the signals Sa, Sb determines the angle of electrical tilt of the antenna assembly and it will therefore be appreciated that by setting the amount of delay applied to the signals by the first and second transmit phase adjusters 760a, 762a, the angle of electrical tilt of the antenna assembly 702 can be adjusted. Moreover, the TCU 104 may be at a location remote from the antenna assembly itself. The provision of the additional phase adjustment arrangements 150E1–150E12 in each of the signal paths to the elements E1 to E12, provides a means for further adjusting the phase of signals supplied to each element in the sub-arrays 700A–700C.

The additional phase adjustment arrangements 150E1–150E12 may take the form of a mechanical phase adjustment arrangement such as a dielectric wedge-type arrangement. Such phase adjustment arrangements are well known in the art, and include a base plate, across which the transmission line T to the antenna element runs, and a generally planar plate of dielectric material disposed between the base plate and the transmission line T. The plate of dielectric material, commonly termed a "wedge", is generally rectangular with a triangular or V-shaped segment cut away from one longitudinal edge thereof. The wedge is movable relative to the base plate and the transmission line T in a direction generally transverse to the transmission line T. Owing to its shape, linear movement of the wedge causes a greater or lesser amount of dielectric material to be interposed between the transmission line and the base plate, thereby causing the propagation velocity and, hence, the phase of any signal on the transmission line T to be shifted by an amount dependent on the linear position of the wedge. Such linear movement is usually effected by a linear actuator in the form of a servo or other motion transducer.

The amount of phase shift applied to the signal on the transmission line T is set by the position of the wedge beneath the transmission line T and the "wedge angle", the internal angle of the V-shape cut into the wedge.

The gain of the boresight reduces as the magnitude of the tilt angle is increased so that, at maximum tilt, the gain of the boresight may be reduced by up to 1.5 dB. It is preferable to limit the increase in side lobe level to −15 dB (or less) when the tilt angle is increased to a maximum value. Consequently, the vertical radiation pattern (VRP) is widened and a reduction in the absolute gain of the boresight occurs. Where the gain of the side lobes can be relaxed to −10 dB relative to the gain of the boresight, then tilt angles of ±20° are possible and higher boresight gain can be obtained.

In receive mode, signals received by the antenna elements are conveyed, via the duplexers 732 and 742, to the demultiplexers 736 and 746 respectively. A portion of these signals is thereby conveyed to the differential phase shifters 760b, 762b associated with each network operator's equipment. The signals from the differential phase shifters are then subject to a vector summation in the multiplexer unit 725b. Appropriate setting of the differential phase shifters associated with a particular network operator will result in signals received on the boresight of the antenna, at the desired angle of tilt for that operator, adding in phase in the multiplexer 725b.

It will be appreciated that the differential phase shift may alternatively be implemented by means of a fixed phase shifter in the position of one of the phase adjusters, 760b or 762b, and a variable phase shifter in the position of the other of said phase adjusters, providing a phase shift differential relative to the fixed one. It will also be appreciated that, to overcome losses associated with the splitting of the received signal, an amplifier could be inserted in the signal path somewhere before the associated splitter 725a (725b), for example following the duplexer 732 (742). Alternatively, or additionally, with suitable precautions taken to avoid its operation being disrupted by the transmitted signal, the amplifier may be installed within the antenna assembly at the end of the input carrier lines 720, 722, with the advantage that the received signal is then amplified before being subjected to losses in the lines 720, 722.

The variable electrical tilt associated with each operator, as implemented in the base station 1760, is individual to each operator, whereas the additional tilt implemented by the mechanical phase adjustment arrangements 150E1–150E12 is common to all operators. In any case, the provision of the additional mechanical phase adjustment arrangements 150E1–150E12 provides the operators with a means for 'fine tuning' the electrical tilt of the antenna system. The additional tilt may be implemented by mechanical means, as described previously (for example, by movement of a dielectric material) Alternatively, however, the additional tilt may be implemented electrically, for example by use of electrical phase shifters of the type described at 760a, 760b, 762a, 762b.

In the embodiment shown in FIG. 8, the differential phase control until 750 including the transmit and receive differential phase control sub-units 750a, 750b, is arranged externally to an operator base station 1760. In an alternative embodiment (not illustrated), the differential phase control unit 705 may be located within the base station itself within transmit and receive demodulators. In this case, the base station 1760 is provided with an external input port to permit control of the differential phase control unit 750. When the differential phase control unit 750 is arranged within the base station 1760, two transmitter paths are required within the base station (from each of the first and second transmit phase adjusters 760a, 760b for a give signal polarity), each of which may be provided with its own power amplification means, thereby permitting total carrier power to be doubled.

Since the feeder lines 756, 758 between the output ports 752, 754 on the TCU 704 and the input ports 712, 714 on the antenna assembly may need to be of the order of 100 meters in length, so there exists the possibility that changes in the length of the feeder lines may affect the phase of transmitted signals. Phase adjustment of signals on a transmission line is usually effected by altering the apparent length of the transmission line by predetermined amounts. Thus, any variation in feeder line length owing to, for example, thermal expansion or contraction of the feeder line, may affect the phase of signals on the line.

The tilt sensitivity of a tiltable antenna assembly such as that described above is typically 17 degrees of phase difference per degree of electrical tilt. If the required resolution and stability of the angle of electrical tilt is +/−0.2 degrees of the set electrical tilt angle, then the required Differential Phase Shift Resolution and Stability (DPSRS) is given by:

$$DPSRS = +/-0.2 \times 17 \text{ degrees}$$
$$= +/-3.4 \text{ degrees (of phase shift)}$$

Since the wavelength at, say, 2 GHz is 15 cm, a differential phase shift of +/−3.4 degrees corresponds to an Allowable Electrical Length Variation (AELV) given by:

$$AELV=(3.4/360)\times 15 \text{ cm}=1.4 \text{ mm}$$

The thermal expansion of a typical feeder cable is 0.01 mm/m/degree centigrade. Thus, if the maximum length of a feeder cable is 100 m, and the temperature increases from 20 to 85 degrees centigrade, the cable will increase in length by (85−20)×100×0.01 mm (=6.5 cm).

The maximum allowable difference in temperature between a pair of feeders, corresponding to the maximum allowable difference in length of 1.4 mm is given by:

$$\text{Maximum temperature difference} = (1.4/0.01) \times 100$$
$$= 1.4 \text{ degrees centigrade.}$$

This high value of sensitivity to electrical length and temperature difference between the feeders results in a need to ensure that the phase difference of the signals Sa, Sb at the input ports 712, 714 of the antenna assembly is the same as that at the output ports 754, 752 of the TCU 704.

Figure 9:
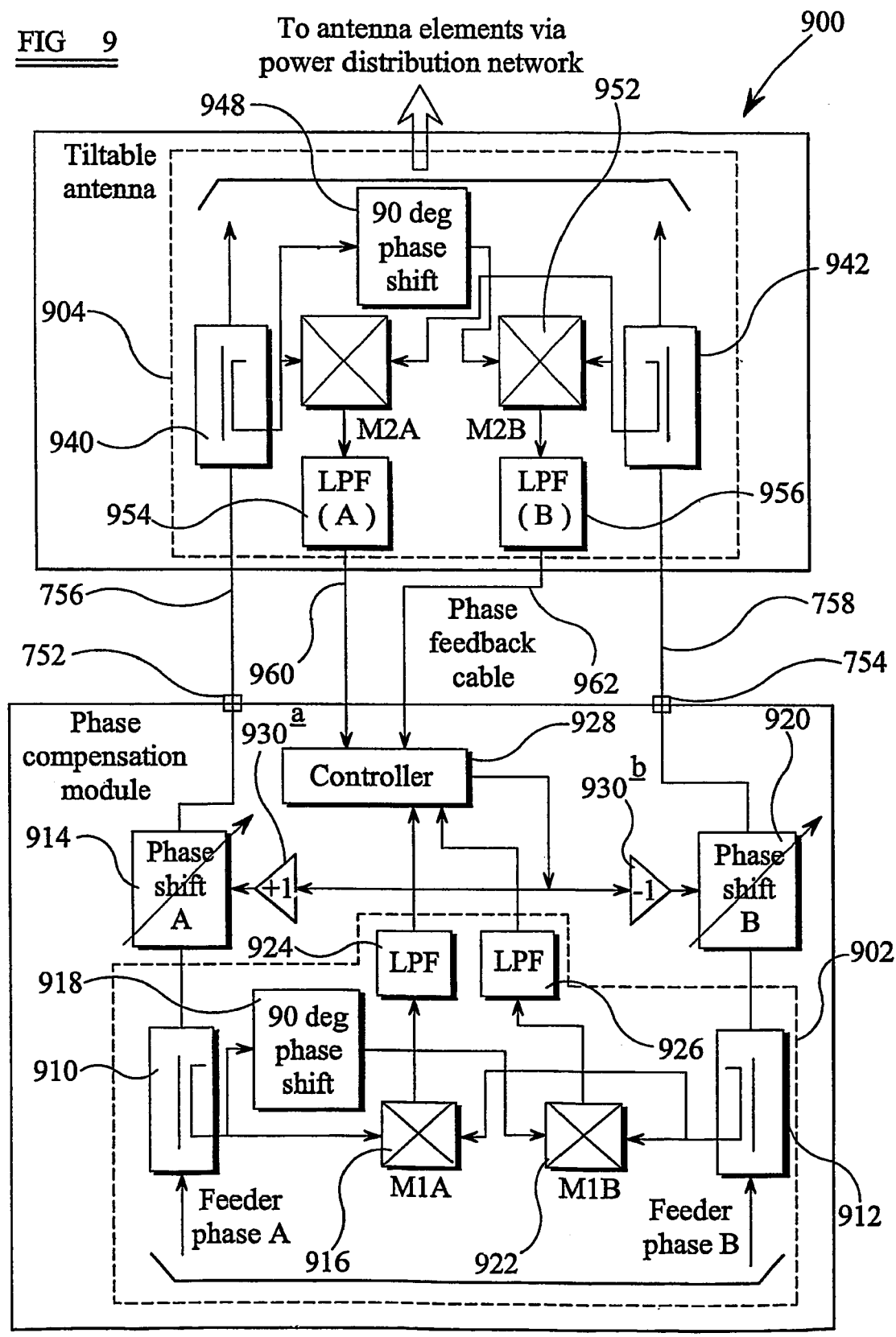
FIG. 9 is a block diagram of an automatic phase control apparatus for use with the antenna system of FIG. 8.

FIG. 9 is a block diagram of a first form of apparatus which automatically compensates for feeder line phase difference owing to such thermal expansion or contraction of the feeder lines 756, 758. The automatic phase compensation apparatus, shown generally at 900, comprises first and second mixer assemblies, depicted by the dashed lines 902, 904. The first mixer assembly 902 includes first and second directional couplers or T-taps 910, 912 which loosely couple the signals on the feeders 756, 758 into the mixers. Each coupler 910, 912 has an input and two outputs. The input of the first coupler 910 is connected to the output of the second combiner unit 740 (not shown in FIG. 9). The first output of the first coupler 910 feeds a first input of a first mixer 916 and the input of a 90 degree phase shifter 918.

The input of the second coupler 912 is connected to the output of the first combiner unit 730 (not shown in FIG. 9). The first output of the second coupler 912 feeds a first input of a second mixer 922 and the second input of the first mixer 916. The output of the 90 degree phase shifter 918 is connected to the second input of the second mixer 922. The second output of the first coupler 910 is connected to a signal input of a first variable phase shift apparatus (hereafter "first phaser") 914 whose signal output is connected to the output port 752. The first output of the second coupler 912 is connected to a signal input of a second variable phase shift apparatus (hereafter "second phaser") 920 whose signal output is connected to the output port 754. The output of each of the first and second mixers 916, 922 is connected to the input of a respective first and second low-pass filter 924, 926, the output of each low-pass filter being connected to first and second inputs respectively of a feedback controller 928.

The second mixer assembly 904 is substantially identical to the first mixer assembly 902 described above. Thus, the second mixer assembly 902 includes third and fourth bridged directional couplers 904, 942, each having an input and two outputs. The input of the third coupler 940 is connected to the input port 712. The first output of the third coupler 940 is connected to the input of the first upper sub-array splitter unit 716A, as shown in FIG. 8. The second output of the third coupler 940 feeds a first input of a third mixer 946 and the input of a second 90 degree phase shifter 948.

The input of the fourth coupler 942 is connected to the input port 714. The first output of the fourth coupler 942 is connected to the input of the first lower sub-array splitter unit 716B, shown in FIG. 8. The second output of the fourth coupler 942 feeds a first input of a fourth mixer 952 and the second input of the third mixer 946. The output of the second 90 degree phase shifter 948 is connected to the second input of the fourth mixer 952.

The output of each of the third and fourth mixers 946, 952 is connected to the input of a respective third and fourth low-pass filter 954, 956, the output of each low-pass filter being connected, via first and second feedback cables 960, 962, to third and fourth inputs respectively of the feedback controller 928.

The output of the feedback controller 928 is connected, via respective amplifiers 930a, 930b to a control input of the first and second phasers 914, 920. The control input of each phaser 914, 920 is arranged to adjust the amount of phase shift applied to signals at the control input, in dependence on the signals supplied.

It will be understood from the above that the first mixer assembly 902, the first and second phasers 914, 920, the controller unit 928 and the amplifiers 930a, 930b, are located within the TCU 704 and that the second mixer assembly 904 is located generally at the antenna assembly 702. In other words, the first and second mixer assemblies 902, 904 are located at opposite ends of, and are connected together by, the feeder lines 756, 758. This is shown and described in more detail with reference to FIG. 11.

The automatic phase compensation apparatus 900 is arranged to compensate for any variation in the phase difference between the signals Sa, Sb at either end of the feeder lines 756, 758. Such variation may be caused by, for example, differential thermal expansion or contraction between the feeder lines. The feeder variation phase compensation technique implemented by FIG. 9 is common to all signals transmitted by the antenna assembly, and is thus common to all antenna operators.

In operation, the signals Sa, Sb, output from the first and second combiner units 730, 740, as described with reference to FIG. 8, are supplied to the inputs of the first and second couplers 910, 912, respectively. The first coupler 910 extracts a portion of the signal Sa and feeds it to the first input of the first mixer 916 and to the input of the 90 degree phase shifter 918. The 90 degree phase shifter adjusts the phase of the extracted portion of the signal Sa by 90 degrees and applies it to the second input of the second mixer 922.

The second coupler 912 extracts a portion of the signal Sb and feeds it to the first input of the second mixer 922 and also to the second input of the first mixer 916. Each mixer 916, 922 mixes the signals received at its inputs and outputs the mixed signal to the first and second low-pass filters 924, 926 respectively. It will be appreciated that the mixed signal supplied to the first low-pass filter 924 from the first mixer 916 will be proportional to the "in phase" carrier component of the signals Sa, Sb whilst the mixed signal supplied to the second low-pass filter 926 from the second mixer 922 will be proportional to the quadrature carrier component of the signals Sa, Sb. The use of the "in phase" and quadrature components is necessary in order to derive an unambiguous measurement of the difference in phase between the signals Sa and Sb.

The low-pass filters 924, 926 substantially remove all but the DC terms from the mixed signals, including carrier components and any transitory fluctuations resulting from the carriers having a zero value following amplitude modulation in the mixers, and apply the DC signals to the first and second inputs of the feedback controller 928.

The signals Sa, Sb applied to the second mixer assembly 904 on the feeder lines 756, 758, are also extracted by the third and fourth T-taps 940, 942 and applied to the third and fourth mixers 946, 952 in the same manner as described above. The outputs from the third and fourth mixers are thus proportional to the in-phase carrier component and the quadrature component of the signals Sa, Sb, respectively. The mixed signals are applied to the third and fourth low-pass filters 954, 956 which again filter out all but the DC terms in the signals and the DC signals are then applied to the third and fourth inputs of the feedback controller 928.

Figure 10:
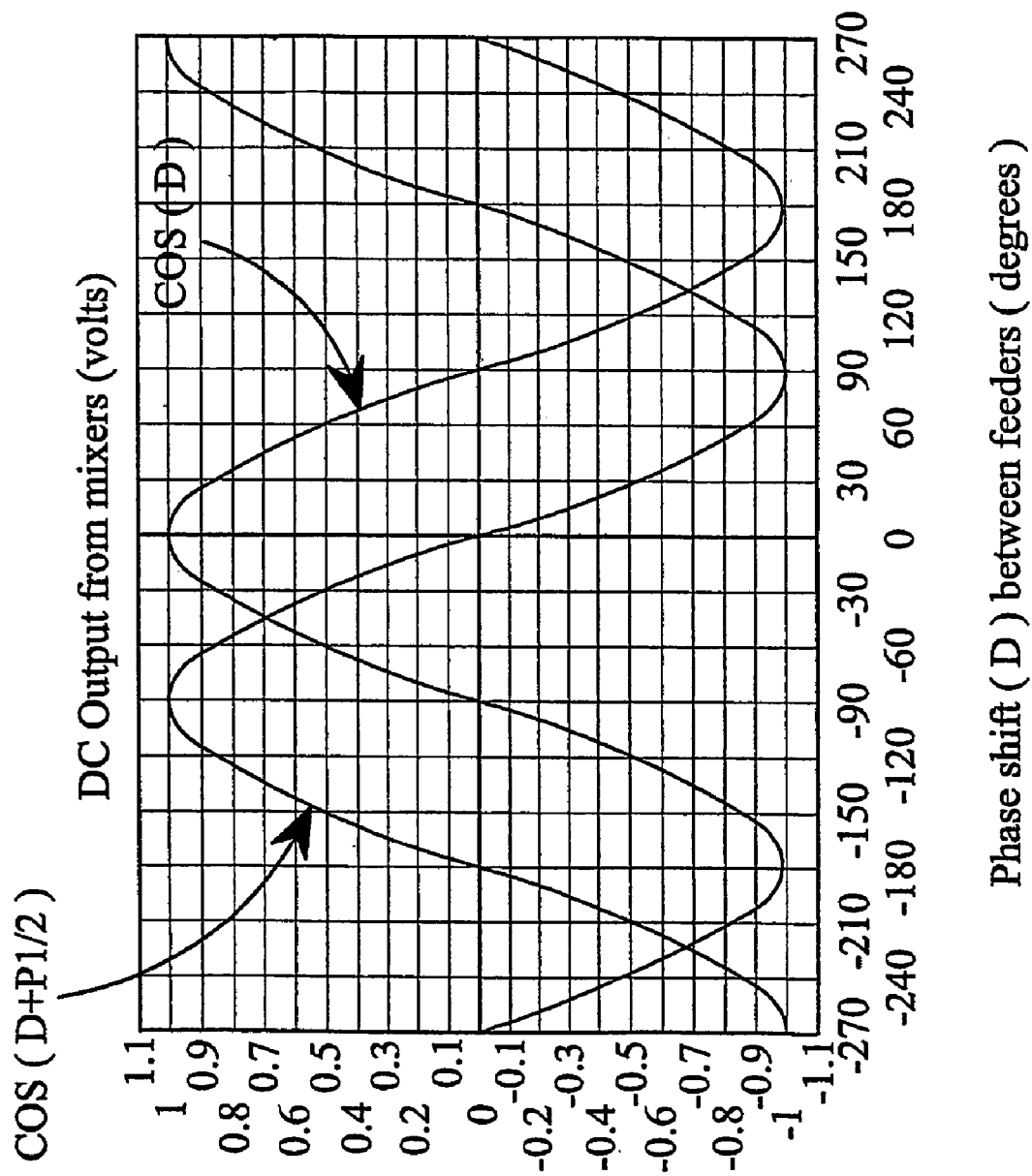
FIG. 10 is a voltage-time diagram of signals output by mixers used in the apparatus of FIG. 9.

An example of the outputs from the first and second (or the third and fourth) low-pass filters as a function of the phase difference between the signals at their inputs is shown in FIG. 10.

By comparing the outputs from the low-pass filters 924, 926, 954, 956, the feedback controller 928 is able to compute the following properties of the antenna system: the phase difference of the signals Sa, Sb at the TCU 704, the phase difference of the signals Sa, Sb at the antenna assembly 702 and the phase error adjustment required to compensate for the difference in phase difference between the control unit and the antenna assembly.

In addition, the feedback controller 928 is able to determine the carrier power of the signals Sa, Sb at the control unit 704, the carrier power of the signals Sa, Sb at the antenna assembly 702 and the signal loss or attenuation along the length of the feeder lines 756, 758.

The feedback controller 928 is then operable to output a control signal which is applied, via the amplifiers 930a, 930b, to the phase control inputs of the first and second phasers 914, 920. The first and second phasers adjust the amount of phase shift applied to the signals Sa, Sb in dependence on the control signal from the feedback controller 928 so as to reduce the error to a minimal level. In other words, the feedback controller 928 is operable to ensure that the phase difference between the signals Sa, Sb at the control unit 704 is substantially equal to the phase difference between the signals Sa, Sb at the antenna assembly 702. The process is performed on the aggregate waveform of all carriers and phase compensation is performed when the phase difference at the antenna assembly has departed from the phase difference at the control unit by a predetermined amount. Thus, any variation in phase of the signals on the feeder lines 756, 758 are compensated for.

Figure 11:
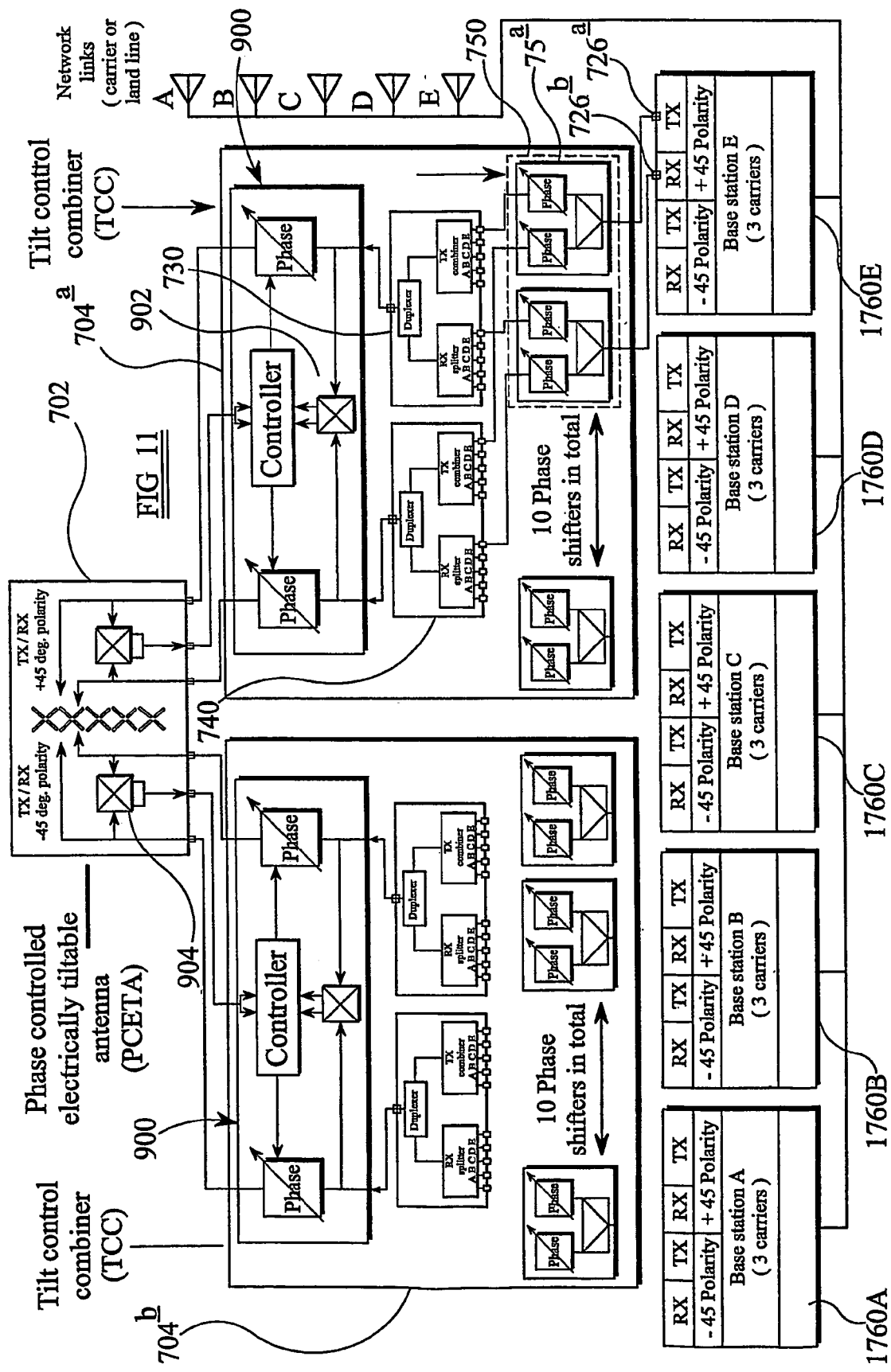
FIG. 11 is a block diagram illustrating the incorporation of the apparatus of FIG. 9 in the system of FIG. 8 and the use of the system by up to five operators.

In FIG. 11, a preferred form of antenna system is shown in block form which illustrates how the automatic phase compensation apparatus shown in FIG. 9 may be incorporated in the system of FIG. 8. While the scale of the drawing is such that individual parts of the system are shown in less detail than in the preceding figures, and while connections are shown for only one user and one polarity only, it will be understood that the system allows up to five operators 1760A–1760E to use the antenna system substantially simultaneously, whereby each operator transmits and receives signals in a different operator frequency band.

In FIG. 11, two TCUs 704a, 704b are shown, illustrating how the system of the present invention can be used with a dual-polarity antenna assembly 702. Each TCU 704a, 704b includes an automatic phase compensation apparatus 900 similar to that shown in FIG. 9, part of which is located at the antenna assembly 702 itself, a pair of combiner units 730, 740 similar to those illustrated in FIG. 8, and five DPCUs 750 (only one full DPCU is shown), one for each operator, similar to those shown in FIG. 8.

Each operator 1760A to 1760E has a transmitted port 726a and a receiver port 726b at the base station 1760, each of which is connected to a respective DPCU in the manner described above. Since there are five operators who may wish to use the antennal system, the TCU includes ten differential phase control sub-units, two for each operator. The outputs of the differential phase control sub-units are connected to the inputs of the transmit combiner networks 734, 744 or to the outputs of the demultiplexers 736, 746 in the first and second combiner units 730, 740 in the manner described with reference to FIG. 8.

The output of each combiner unit 730, 740 is applied to the first and second mixer assemblies respectively of the automatic phase compensation apparatus 900, as described with reference to FIG. 9. Any variations in the phase difference between the signals Sa, Sb, as measured at the TCU 704 by the mixer assembly 902 and at the antenna assembly 702 by the mixer assembly 904, affects the angle of tilt of the antenna assembly for all operators and so is compensated for by the automatic phase compensation apparatus 900. The compensated signals are then applied to the antenna assembly for transmission in the conventional manner.

As mentioned above, the transmit combiner networks 734, 744 in the combiner units 730, 740 each have five inputs and the demultiplexers 736, 746 each have five outputs. It will be understood, therefore, that although two differential phase control sub-units are required for each operator, one for transmitting and one for receiving, all five operators are unable to share the two combiner units 730, 740 in the TCU 704. Each of the other operators using the base station has a respective pair of differential phase control sub-units, the outputs of which are connected to other inputs of the transmit combiner networks 734, 744 or outputs of the multiplexers 736, 746 in the combiner units 730, 740. Since the differential phase shifting of signals occurs prior to multiplexing by the transmit combiner networks 734, 744, an individual angle of title can be set by each operator independently.

Whilst the apparatus in FIG. 11 is advantageous, in that it compensates for any differences in the length of the feeder line 756, 758 owing to, for example, differential thermal expansion or contraction between the lines, the phase compensation method is common to all operators of the system. In a further preferred embodiment, phase compensation is applied separately for each operator. Additionally, the apparatus of FIG. 11 only permits compensation for differences arising in the length of the feeders to the antenna assembly, whereas in practice phase difference errors may also arise in the combiner units 730, 740 and in the input carrier lines 720, 722, for example.

Figure 12:
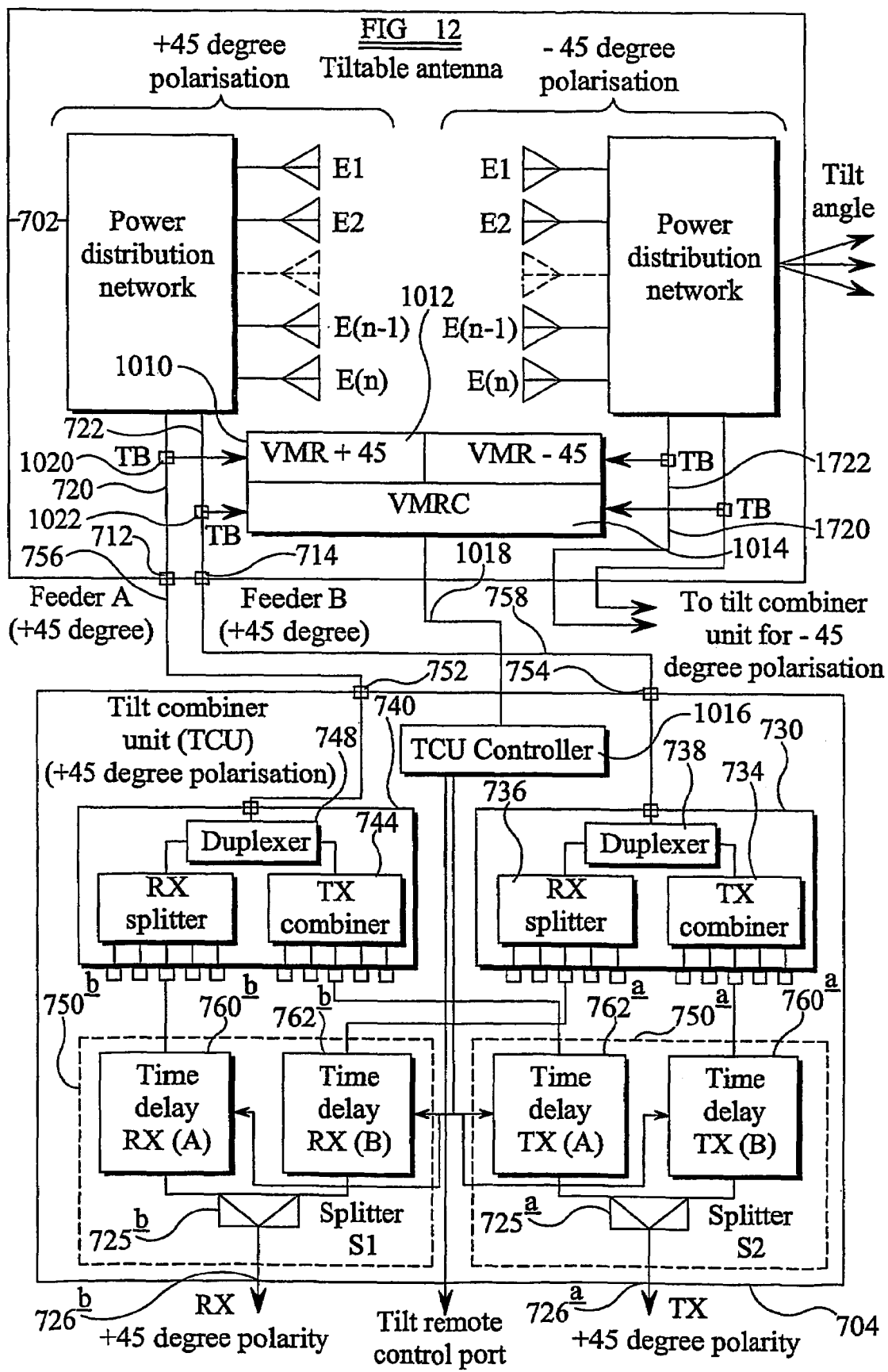
FIG. 12 is a block diagram of the antenna system of FIG. 8 incorporating a Phase Measuring Receiver Module.

FIG. 12 is a block diagram of an antenna system incorporating a second form of apparatus, which is arranged to compensate for any variations in the phase difference of the signals Sa, Sb between the antenna element end of the transmit path and the base station end of the transmit path for each operator separately. In this embodiment, the antenna system comprises an antenna assembly 702 and a TCU 704 arranged as described with reference to FIG. 8. In addition, the antenna assembly includes a vector measuring receiver module (VMRM) 1010. The VMRM 1010 comprises a Vector Measuring Receiver (VMR) 1012 and a Vector Measuring Receiver Controller (VMRC) 1014 connected thereto. In FIG. 12, the antenna assembly 702 is again a dual polarity antenna and requires the provision of two VMRs as shown, each of which is connected to the common VMRC 1014. However, for clarity, only the connections and operation of the VMR 1012 for one polarity will be described. As an alternative, a single VMR may be included, with switching means being provided to switch the inputs to the VMR between the two polarisations of the system.

The TCU 704 includes a TCU Controller (TCUC) 1016 which is connected to the VMRC 1014 by means of a controller cable 1018 which is capable of carrying digital signals. The controller cable 1018 is also arranged to carry the power needed by the VMRM 1010 in the antenna assembly 702. The TCUC 1016 has a control output which is connected to the control input of each of the transmit and receive phase adjusters 760a, 760b, 762a, 762b in the two differential phase control sub-units 750a, 750b. The TCUC 1016 also has a control input arranged to receive a control signal from a network operator for setting the required angle of tilt for the antenna assembly 702. Interposed on each of the input carrier lines 720, 722 is a respective T-Tap or sniffer 1020, 1022. The output of each sniffer 1020, 1022 is connected to an input of the VMR 1012.

Figure 13:
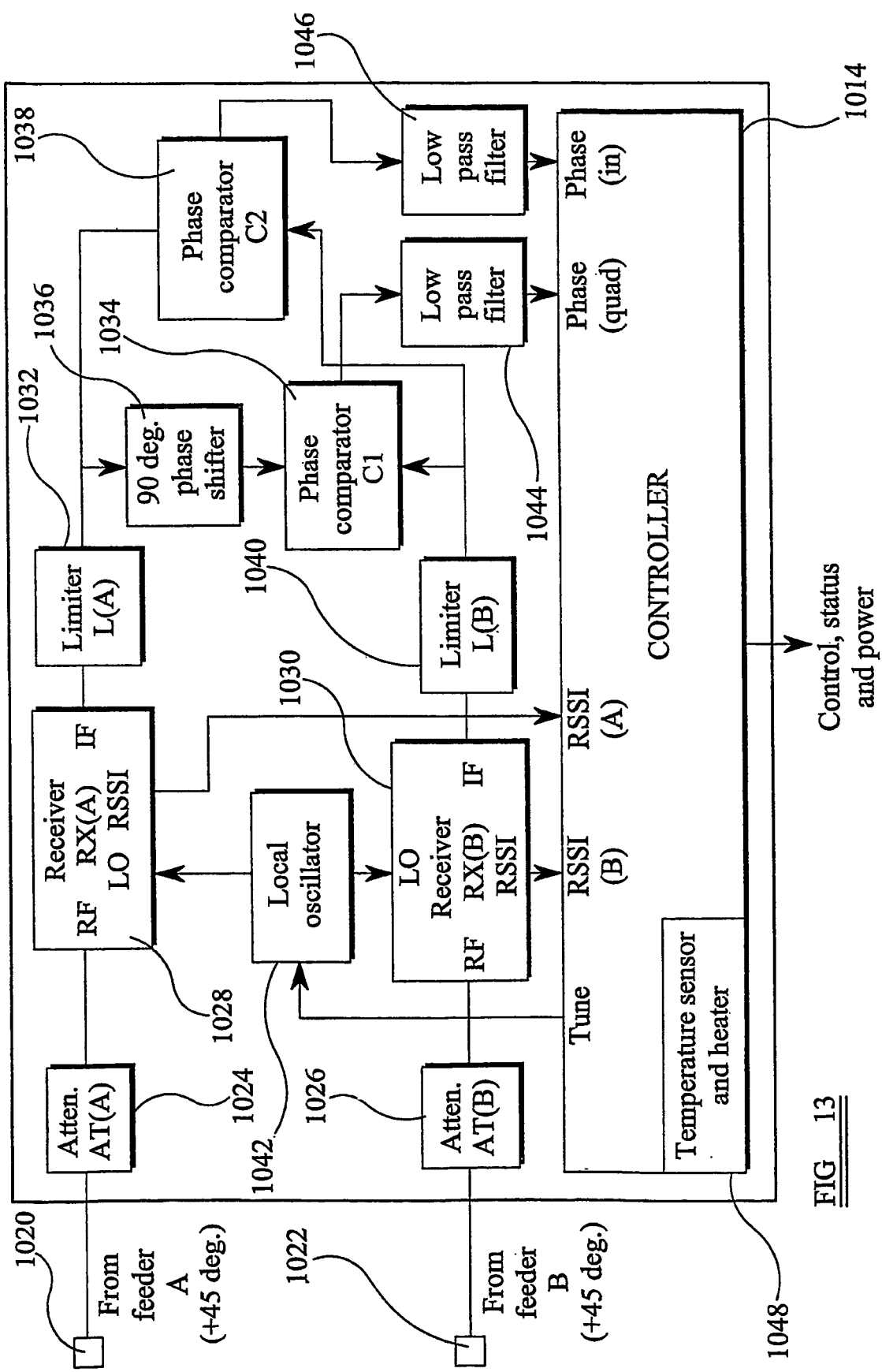
FIG. 13 illustrates part of the Phase Measuring Receiver Module in more detail.

FIG. 13 is a schematic block diagram of the VMR 1012 and illustrates its connection to the VMRC 1014. The output of each of the T-Taps 1020, 1022 is fed to the input of a respective attenuator 1024, 1026, the output of which is connected to a first input of respective first and second receivers 1028, 1030. The output of the first receiver is fed to the input of a first limiter 1032, the output of which is connected to a first comparator 1034, via a 90 degree phase shifter 1036, and also directly to the input of a second comparator 1038. The output of the second receiver 1030 is fed to the input of a second limiter 1040, the output of which is connected directly to both the first and second comparators 1034, 1038.

Each of the first and second receivers 1028, 1030 is tuneable by means of a local oscillator 1042. The local oscillator 1042 generates a signal at a predetermined frequency which is combined in the respective receiver with the signal from the T-Taps to produce an output signal of intermediate frequency, the intermediate frequency signal being applied to the respective limiters 1032, 1040. The purpose of the local oscillator 1042 is to enable tuning of the first and second receivers 1028, 1030 to each of the frequencies used by the operators. This enables the measurement of the phase of signals Sa, Sb from more than one operator and, thus, differences in error compensation between different operator frequencies can be accounted for.

The output of each of the first and second comparators 1034, 1038 is connected to the input of a respective low-pass filter 1044, 1046, the outputs of each filter being fed to respective inputs of the VMRC 1014.

Referring to both FIGS. 12 and 13, in operation the TCU 704 operates in the manner described above to supply the signals Sa, Sb on the feeder lines 756, 758, which signals are input to the antenna assembly 702 at input ports 712, 714 and applied to the input carrier lines 720, 722. The first and second T-Taps 1020,1022 extract a portion of the respective signal Sa, Sb and apply the extracted portion to the respective attenuator 1024, 1026. The purpose of the attenuators is to set the signal input to the respective receiver to the level that gives optimum performance of the receiver with respect to its dynamic range, linearity and noise immunity. The attenuated portion of the signal Sa, Sb is combined in the respective receiver 1028, 1030 with the signal applied thereto by the local oscillator 1042 and the intermediate frequency signal output by each receiver 1028, 1030 is passed through the respective limiter 1032, 1040 so as to remove amplitude variations within the signals.

The extracted portion of the signal Sa is fed to the first comparator 1034 via the phase shifter 1036 which adjusts the phase of the signal by 90 degrees. The extracted portion of the signal Sb is fed directly to the first comparator 1034. The output of the first comparator 1034 is applied to the first low-pass filter 1044 which removes substantially all but the DC terms of the signal, including any residual carrier components in the output of the comparator and also any transitory variations due to the amplitude of the signals at the input to the comparators passing through a zero value.

The extracted portion of the signal Sa is also fed directly to the second comparator 1038 as is the extracted portion of the signal Sb. The output of the second comparator 1038 is applied to the second low-pass filter 1046 which, like the first low-pass filter, removes substantially all but the DC terms of the signal, including any residual carrier components in the output of the comparator and also any transitory variations due to the amplitude of the signals at the input to the comparators passing through a zero value.

The output of the first low-pass filter 1044 is thus the quadrature representation of the difference in phase between the signals Sa, Sb while the output of the second low-pass filter 1046 is the "in-phase" representation of the phase difference between signals Sa, Sb. Both the quadrature and in-phase representations are required in order to provide an unambiguous measurement of the phase difference between the signals Sa, Sb.

The first and second receivers 1028, 1030 also generate a respective Receiver Signal Strength Indication (RSSI) each of which is applied to the VMRC 1014 for transmission to the TCUC 1016. The RSSI is used for built-in test purposes and as an indicator for Health and Safety assessments. The VMRC 1014 is also provided with a temperature sensor and heater 1048. The sensor measures the temperature at the VRMC and is operable to actuate the heater in order to limit the minimum operating temperature to a satisfactory value to ensure correct operation.

The output from the VMRC 1014 is a direct measurement of the phase difference between the signals Sa, Sb and this applied to the TCUC 1016 via the digital control cable 1018. The TCUC 1016 is arranged to tune the first and second receivers 1028, 1030 to a particular frequency and to obtain the required angle of tilt (i.e. the required phase difference between the signals Sa, Sb) at that frequency. On receiving the measured phase difference between the signals Sa, Sb, at the required frequency, the TCUC 1016 is operable to apply control signals to the control inputs of the first and second transmit and receive phase shifters in each of the differential phase control sub-units 750a, 750b so that the actual angle of electrical tilt of the antenna assembly 702 is substantially the same as the required angle of electrical tilt.

It will be appreciated that the apparatus of FIG. 12 enables phase shift errors between different operators (i.e. due to their different operating frequencies) to be compensated for independently by virtue of the VMRM 1010. The measuring and phase adjusting process may be performed when the system is initially switched on, when the angle of electrical tilt is required to be changed and/or periodically to compensate for thermal fluctuations in the feeder lines, for example every 10 minutes.

In addition, the TCUC 1016 may be set to either a local mode or a remote mode. In local mode, the angle of electrical tilt required by each operator is set locally at the TCU 704. In remote mode, the requested angle of electrical tilt may be set remotely, either by radio link or over a telephone line or the like.

The TCU 704 also displays, locally and/or remotely, the angles of electrical tilt required by each operator, the actual angles of electrical tilt of the antenna assembly, the error between the required and actual angles of electrical tilt for each operator, the RF power levels at the antenna assembly for the signals of each operator, the temperature at the antenna assembly and the TCU power supply voltages and currents.

Figure 14:
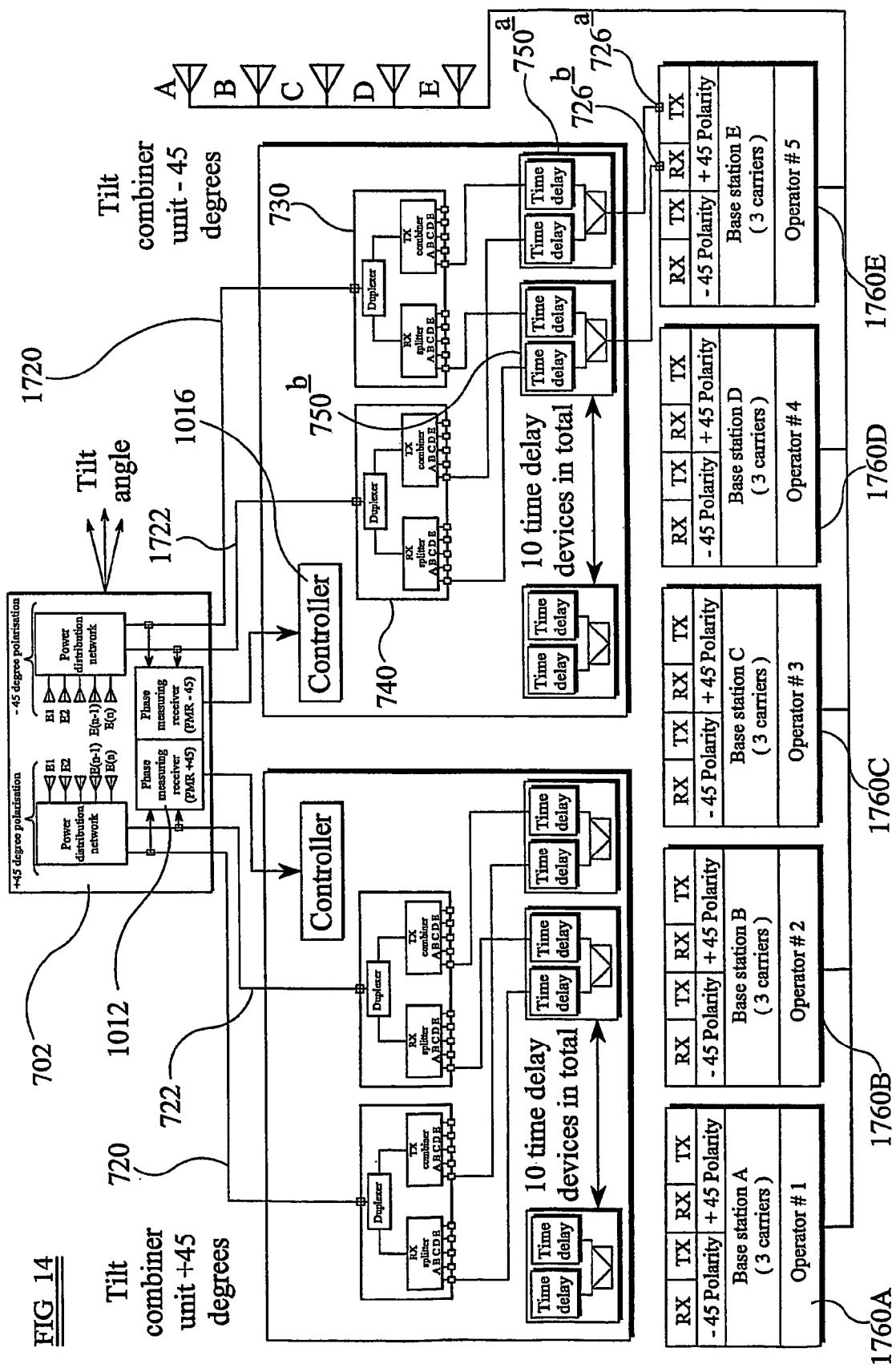
FIG. 14 is a block diagram illustrating the incorporation of the Phase Measuring Receiver Module of FIG. 12 in the system of FIG. 8 and the use of the system by up to five operators.

In FIG. 14, the use of the antenna system of FIG. 12 is shown with a dual polarity antenna assembly by five operators. For clarity, only the connections for one polarity and one operator are shown. It will be clear that the embodiment of FIG. 14 is similar to that of FIG. 11 with the exception that the automatic phase compensation apparatus of FIG. 11 has been replaced by the VMRM 1010 of FIGS. 12 and 13.

In some circumstances, the apparatus of FIGS. 12 to 14 will be adequate to compensate phase differences between different operators. However, the method relies on measurements determined through the transmit path, whereas accuracy can be improved further by independently measuring phase differences through the receive path also. For the purposes of this specification the "transmit path" for signals is intended to mean the path followed by the delayed signals output from the combiner unit 704 as they are passed along the feeder lines 756, 758, along the input carrier lines 720, 722 and to the antenna elements, and including the splitter, amplifier, filter and other components present in this path. The "receive path" for signals is intended to mean the path followed by the signal received at the antenna elements as they are passed along the carrier lines 720, 722, the feeder lines 756, 758 and to the combiner unit 704, and including the splitter, amplifier, filter and other components present in this path.

Figure 15:
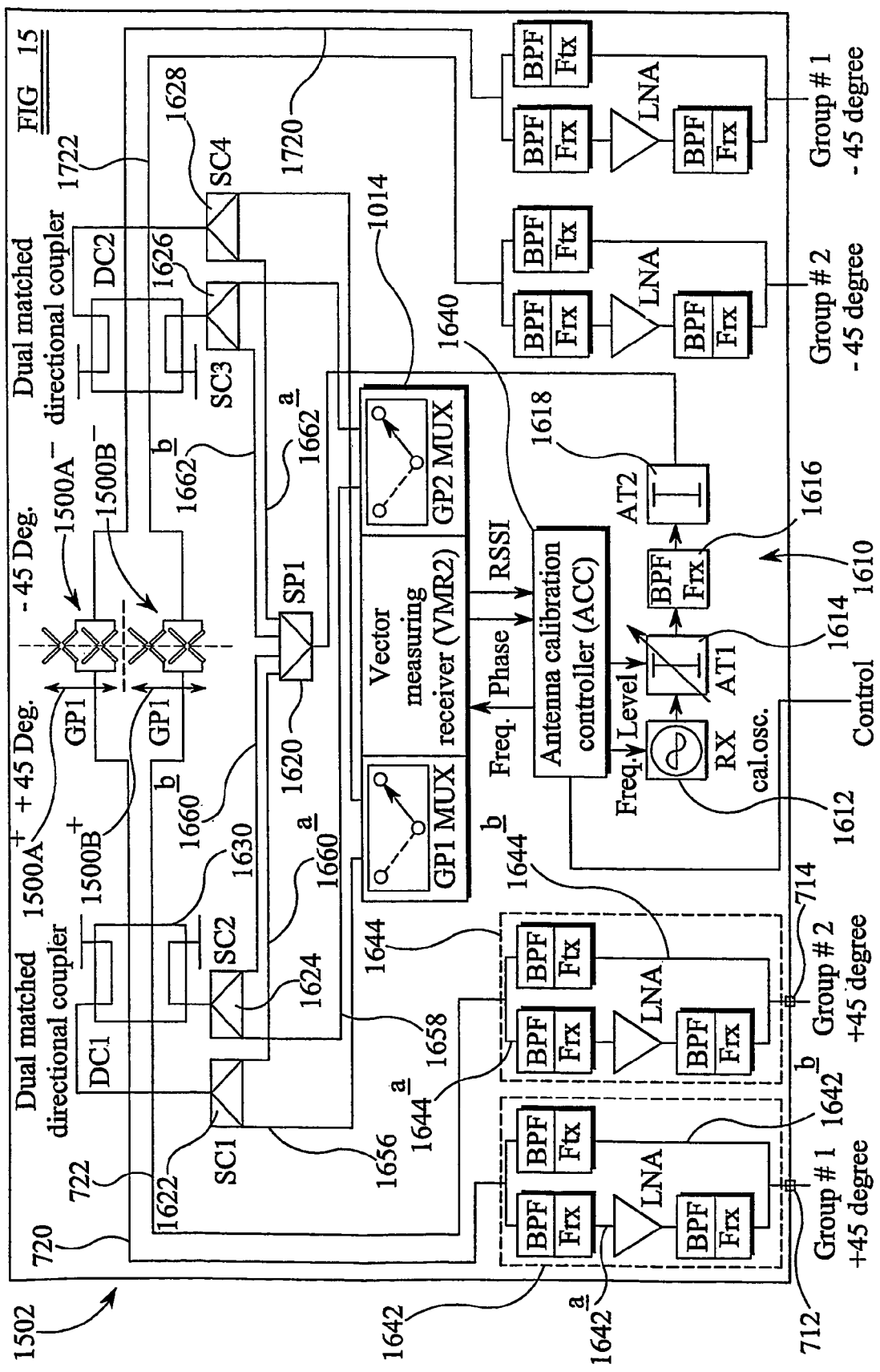
FIG. 15 is a block diagram to show the components of an antenna for implementing an alternative phase compensation method.
Figure 16:
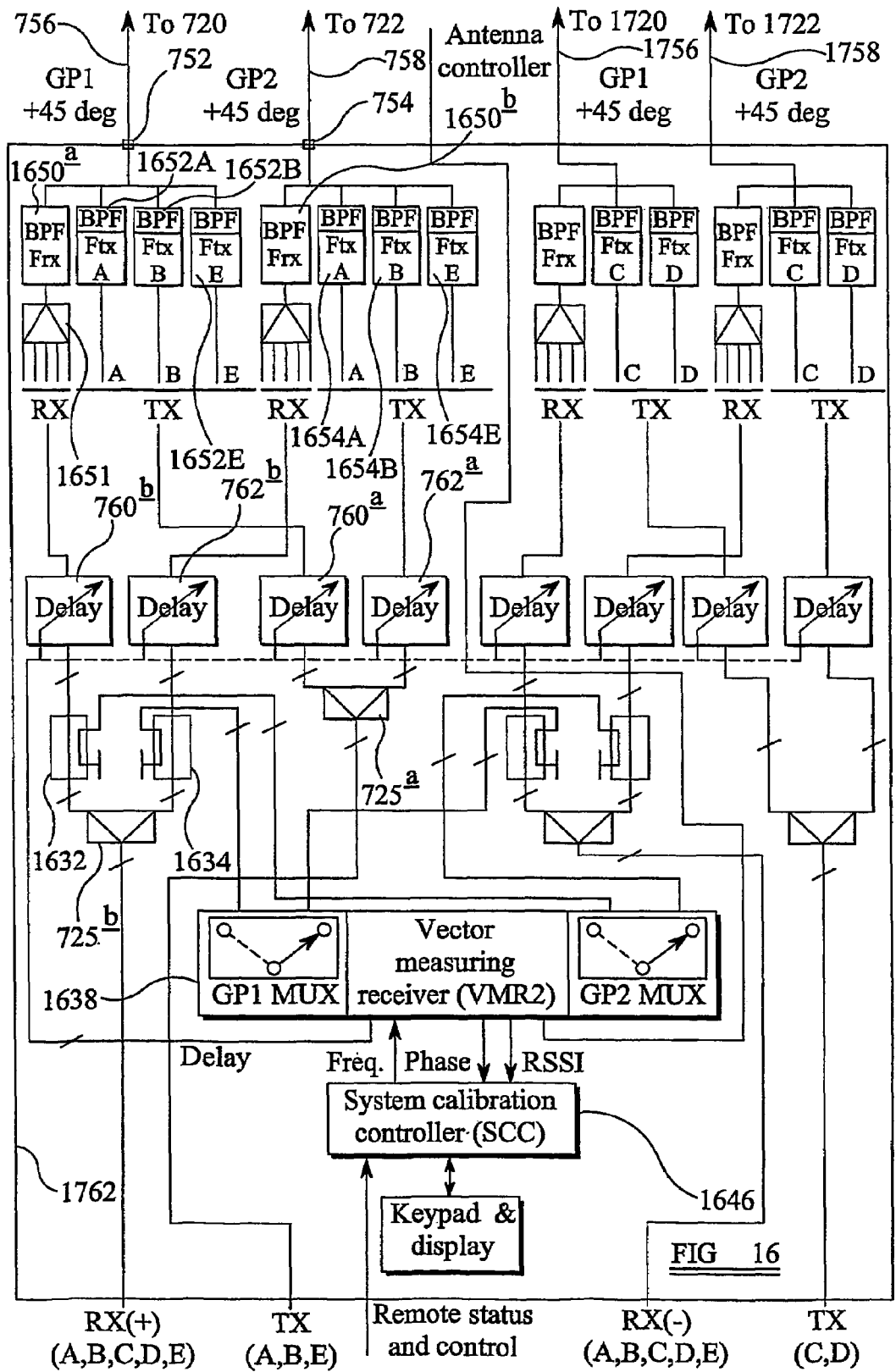
FIG. 16 is a block diagram to show the components of an antenna combiner unit to implement the alternative phase compensation method of FIG. 15.

FIGS. 15 and 16 show a further improved apparatus in which phase difference compensation is implemented for both transmit and receive modes separately (i.e. for transmit and receive paths separately), as well as for individual operator frequencies. For simplicity, FIG. 15 shows just two antenna sub-arrays (as opposed to the three sub-arrays of FIG. 8), of a dual-polarity antenna assembly 1502; a first positive polarity sub-array 1500A$^+$ and a second positive polarity sub-array 1500B$^+$ and two negative polarity sub-arrays 1500A$^-$, 1500B$^-$ also. Operation is the same for the negative polarisation channel, and so will not be described in further detail. Where only two sub-arrays 1500A$^+$ and 1500B$^+$ are provided, the splitter (716A–716H) and combiner (726A, 726B) arrangement of the FIG. 8 apparatus is not required, and carrier lines 720, 722 supply input signals directly to the sub-arrays 1500A, 1500B.

The method employed to measure and correct variations in the time delay between the transmit and receive paths for the controlling of the angle of electrical tilt of the antenna measures the phase difference between the signal paths both in transmit mode and in receive mode. This is implemented using either the frequencies used for the base station transmitter (the down-link) or those used for the base station receiver (the up-link). Using this method it is possible to measure the phase difference between pairs of feeders at the frequencies used for each operator's transmit and receive frequency allocations.

Considering firstly measurement of differential phase for the receive path, the antennal assembly (shown in FIG. 15) includes a Calibration Tone Generator (CTG) 1610 comprising a calibration oscillator 1612, a variable attenuator 1614, a bandpass filter 1616 and a second attenuator 1618. The Vector Measuring Receiver 1012 of FIGS. 8 and 12 is also identified, along with an Antenna Calibration Controller (ACC) 1640 which controls the Calibration Tone Generator (CTG) 1610 and communicates with System Calibration Controller (SCC) of the base station 1762. The CTG 1610 is arranged to generate unmodulated tones in a 200 Hz bandwidth which are preferably stabilised to +/−10 kHz in 2 GHz or +/−2 parts in $10^5$. The tone is set to the required frequency to measure a particular operator's receive tilt by means of the Antenna Calibration Controller (ACC) 1640. The level of the signal can be adjusted by means of the attenuator 1614 and the bandpass filter 1616 is provided to prevent signals at transmit frequencies from entering the calibration oscillator 1612 (i.e. only receive frequencies can pass) and the second attenuator 1618 is required for impedance matching purposes.

The tone signal is applied to a first splitter/combiner unit 1620 (SP1) whereby it is split along four equal signal paths 1660a, 1660b, 1662a, 1662b, two signal paths, 1660a, 1660b, to first and second positive polarisation feeder lines 720, 722 and two signal paths 1662a, 1662b to first and second negative polarisation feeder lines 1521, 1523. Each signal is injected, via respective splitter/combiner units 1622–1628 (SC1–SC4), to the respective feeder line. For simplicity, only the feeder lines 756, 758 and the carrier lines 720, 722 to the sub-arrays for the positive polarity array will be considered but it will be appreciated that the same phase compensation principles apply to the feeder lines 1756, 1758 and the carrier lines 1720, 1722 for the negative polarity array.

The tone signal, or each part thereof, is injected into the carrier lines 720, 722 at the edge of each receive channel (typically 5 MHz spaced channels) through a directional coupler 1630, such that the tone signal does not interfere or add to the received signal. The tone signal supplied down each of the carrier lines 720, 722 is supplied to a respective arrangement 1642, 1644 of bandpass filters and amplifiers. The arrangements 1642, 1644 are identical and each includes a respective receive frequency arm 1642a, 1644a and a respective transmit frequency arm 1642b, 1644b. The receive frequency arm of each arrangement includes a band pass filter (BPF, FRx) for selectively transmitting receive frequencies. The transmit frequency arm of each arrangement includes a band pass filter (BPF, FTx) for selectively transmitting transmit frequencies. It is also desirable to include a low noise amplifier (LNA) in the receive frequency arm 1642a, 1644a.

Referring to FIG. 16, the tone signals transmitted through the transmit frequency arms 1642b, 1644b are supplied to the base station 1762 at ports 752, 754 (also shown in FIG. 12). FIG. 16 shows the base station 1762 for five different operators, although components of the base station for only some of the operators are shown. Where the notation in FIG. 16 indicates "/5", this denotes that five of such components are present (although not shown), and likewise for other numbers (e.g. "/30" indicates there are 30 of such components).

For the first sub-array 1500A⁺ of the antenna 1502, and its respective carrier line 720, a single filter arrangement 1650a is provided in the base station 1762 for the receive signals, which are then split by a five way splitter unit 1651 for supply to a respective variable delay unit 760b (i.e. equivalent to that shown in FIG. 12 and only one of which is shown for one of the operators). Receive signals for the other sub-array 1500B, and the respective carrier line 722, pass through a filter arrangement 1650b to a second variable delay unit 762b (again, only one of which is shown for one of the operators).

The receive signals transmitted back down the carrier lines 720, 722 to the base station 1762 are supplied through the respective filter arrangement 1650a, 1650b to a second Vector Measuring Receiver 1638 (VMR) in the antenna control unit or base station 1762 via respective directional couplers 1632, 1634. When in receive mode the tone signals originating from the CTG 1612 and supplied down the carrier lines 720, 722 follow the same receive path as the receive signals. The Vector Measuring Receiver 1638 is under the control of the System Calibration Controller 1646 and is operable to select the appropriate pair of directional couplers 1632, 1634 for a selected operator, thereby to obtain a sample of the received tone signal for measuring. Measurements for the delay between the tone signals transmitted through the lines 720, 756 and through the lines 722,758 (i.e. a "receive path phase difference measurement") are obtained by the VMR 1638, together with signal strength information, and are returned to the SCC 1646. The measured difference in phase difference between the carrier pairs 720, 756 and 722, 758 at the antenna and the combiner unit end of the receive path, is used to adjust the phase difference at the antenna by an amount necessary to ensure the angle of electrical tilt requested by an individual operator is that which is achieved. Specifically, the SCC 1646 adjusts the variable delay associated with the selected operator to achieve the delay required, allowing for any discrepancies in the receive path. This operation can be performed for each operator in turn, as often as is necessary to maintain correct adjustment of the antenna.

For the receive path calibration (i.e. phase compensation) it is desirable if the tone signal is selected to have a frequency at or near the edge of the operator frequency channel, but equally the tone signal frequency may be selected to fall within the operator frequency channel. Typically, the receive path channels have a bandwidth of 5 MHz, and the tone signal preferably has a bandwidth of 200 Hz.

Considering next the transmit path, with reference to FIG. 16 the antenna base station 1762 also includes respective transmit filter arrangements 1652A, 1654A associated with the feeder lines 720, 722. The transmit filter arrangements 1652A, 1654A are arranged to filter transmit frequency signals for operator A, but prevent receive frequency signals from passing through. For each of operators B and E, corresponding transmit filter arrangements 1652B, 1652E, and 1654B, 1654E are also provided for each of the carrier lines 720, 722.

In this particular embodiment of the invention, operators C and D transmit on the negative polarisation antenna elements (1500A⁻ and 1500B⁻), whereas operators A, B and E transmit on the positive polarisation elements (1500A⁺, 1500B⁺).

As described previously for FIGS. 8 and 12, the transmit signals for each of the three operators A, B and E are split by the splitter unit 725a and are supplied through the respective variable delay unit 760a (A, B or E) to the filter arrangements 1652A, 1652B, 1652E, 1654A, 1654B, 1654E. Each filter arrangement is configured to pass signals within a particular operator frequency band, and transmits the selected operator transmit signals to carrier lines 720, 722 respectively.

For transmit path calibration purposes, the directional coupler 1630 of the antenna 1502 (as shown in FIG. 15) extracts a small portion of the transmit frequency signals from each carrier line 720, 722 and supplies two signals on lines 1656, 1658 to the Vectro Measuring Receiver (VMR) 1012 in the antenna 1502. For each operator frequency channel, the VMR 1012 measures the phase difference between transmit signals supplied on feeder line 720 and those supplied on feeder line 722 at substantially the centre frequency of the selected transmit signal bandwidth, referred to as "the transmit path phase difference measurement". The transmit path phase difference measurement bandwidth is preferably selected to be substantially the same as the transmit signal bandwidth for each particular operator.

The transmit path phase difference measurement calculated in the antenna is fed back to the ACC 1640, which communicates with the SCC 1646 (as shown in FIG. 16) in the base station 1762. The measured phase difference between transmit signals in the antenna is compared with the measured phase difference as set in the base station 1762 by the SCC 1646 and thus an adjustment is made to the phase difference at the antenna to ensure the required angle of electrical tilt for each operator is achieved in transmit mode, despite any difference in phase difference between the ends of the transmit paths.

The phase difference compensation method described with reference to FIGS. 15 and 16 is advantageous in that it permits the angle of tilt to be accurately determined by accounting for differences in phase, in both transmit and receive modes independently, for each of the operators A to E independently. The methods allow all operator transmit and receive allocations to be calibrated for differential phase between the transmit and receive paths, not only during continuous operation but also for manufacturing alignment and test, commissioning and maintenance. The calibration or compensation operation can be performed for each operator in turn as often as it is necessary to maintain correct adjustment of the antenna.

In the arrangement of FIG. 9, for example, the required angle of tilt is only precisely achieved at one frequency, as for other frequencies the phase difference through the feeder lines 756, 758 will be different and hence the direction at which the phases add to give maximum gain (the "boresight") will be different. In such systems the phase difference is not only different for different transmit frequencies (i.e. for different operators) but is different through the transmit and receive paths for each. Using the system of FIGS. 15 and 16, the desired angle of tilt can be achieved accurately for each operator and it can be ensured that it is the same for both transmit and receive modes, if required, as any phase difference effect which would otherwise arise between the two paths is compensated for. Furthermore, if an operator requires the angle of tilt to be different in transmit mode from that in receive mode, the system can provide it.

As an alternative to using a tone signal to calibrate the receive path, a spread spectrum signal may be generated in the oscillator 1612. It will be appreciated that by using this technique the directional couplers 1632, 1634 couple the RF spread spectrum calibration signal with receive signals for measurement in the VMR 1638 in the base station 1762.

In order to avoid providing an oscillator 1612 in the antenna 1502 at the top of the antenna mast, along with the associated attenuation and filter components, 1614, 1616, 1618, a frequency converter may be provided to permit a sample of the transmit frequency signals (for each operator) to be moved into the corresponding receive path. By measuring the delay between the transmit signals at the bottom of the receive path, the differential delay around the whole transmit/receive path can be determined and the appropriate adjustment for each operator frequency channel can be made in the SCC 1646. In order to obtain a separate measurement for the transmit path only, the same transmit signal may be transferred to the receive path for each operator channel i.e. the transmit signal for one operator is essentially used as a calibration signal for all operators. By comparing the differential phase measurement for the receive path with the differential phase measurement for the transmit/receive loop, the phase difference for the transmit path can be determined for each operator.

As a further alternative embodiment, only one Vector Measuring Receiver need be provided 1012, and that is in the base station 1762. In this case the Calibration Generator Oscillator (CGO) in the antenna 1502 operates on both the transmit and receive frequencies, so that the transmit frequencies are passed back down through the carrier lines 720, 722 for the phase difference to be measured in the base station 1762. The VMR 1012 in the base station 1762 therefore also has to tune to the transmit frequencies, as well as the receive frequencies. It is possible to send the transmit frequency signals back down the carrier lines 720, 722 to the VMR 1012 in the base station 1762 for phase compensation purposes as the transmit path does not include amplifier or other active devices which prevent reverse passage.

It will be appreciated that the present invention provides an effective way of allowing multiple operators to use a phased array antenna assembly where the angle of electrical tilt of the antenna assembly may be different for each operator and may be adjusted remotely and independently by the operator.

The angle of electrical tilt for each operator may also be different in transmit and receive modes, or made precisely equal.

Where the means for controlling the angle of electrical tilt of the antenna assembly is located a sufficient distance from the antenna assembly for differential thermal expansion or contraction of the feeder lines, and hence variations in the phase of the signals on the feeder lines, to be a problem, the invention provides an effective method and apparatus for compensating for such variations in phase so that the angle of electrical tilt at the antenna is the same as the angle of electrical tilt required by each operator.

The invention claimed is:

1. An antenna system for use in at least one of transmitting and receiving first and second signals the first signal being in a first frequency band associated with a first operator and the second signal being in a second frequency band associated with a second operator, the antenna system comprising:
   a) an antenna assembly having an adjustable angle of electrical tilt, and including a plurality of antenna elements for at least one of transmitting and receiving the first and second signals;
   b) control means for controlling electrically the phase of the first and second signals and thereby to control the angle of electrical tilt of the antenna assembly; and
   c) combiner means for enabling the antenna assembly to at least one of transmit and receive the first signal at a first angle of electrical tilt and the second signals at a second angle of electrical tilt, the combiner means being arranged such that the first and second signals pass via shared antenna elements.

2. An antenna system as claimed in claim 1, including first and second feeder lines for supplying first and second signals of a first polarisation to and from the antenna assembly.

3. An antenna system as claimed in claim 2, further including third and fourth feeder lines for supplying third and fourth signals of a second polarisation to and from the antenna assembly, the second polarisation being opposite in sign to the first polarization.

4. An antenna system as claimed in claim 2 including no more than four feeder lines for supplying signals to and from the antenna assembly.

5. An antenna system as claimed in claim 1 wherein the control means is arranged to electrically control the phase of signals supplied to at least one of the sub-arrays from a location remote from the antenna assembly, thereby to control the angle of electrical tilt of the antenna assembly.

6. An antenna system as claimed in claim 2 wherein the control means comprise a plurality of differential phase control units, each differential phase control unit being associated with a respective one of the operators of the antenna system.

7. An antenna system as claimed in claim 6, wherein each of the differential phase control units, comprises first and second differential phase control sub-units, the first differential phase control sub-units being arranged to electrically control the phase of signals supplied thereto for transmission by the antenna assembly and the second differential phase control sub-units being arranged to electrically control the phase of signals supplied thereto, the signals having been received by the antenna assembly.

8. An antenna system as claimed in claim 2, wherein the combiner means include first and second combiner units, each combiner unit including a respective transmit combiner network and a respective receive splitter network, the transmit combiner network having a plurality of inputs for connection to transmitter means of a corresponding plurality of operators of the antenna system, the transmit combiner network being arranged to multiplex signals applied to the inputs by the transmitter means, thereby to output a single multiplexed signal.

9. An antenna system as claimed in claim 8, wherein the transmit combiner network includes a first transmit multiplexer arranged to receive at least two signals, each from an associated respective transmitter, and a second transmit multiplexer arranged to receive at least two signals, each from an associated respective transmitter, wherein each of the first and second transmit multiplexers is provided with a band pass filter arrangement for filtering signals received from a first one of the associated respective transmitters with a pass band separated by a stop-band from a pass-band of the or each other of the associated respective transmitters.

10. An antenna system as claimed in claim 8, wherein the receive splitter network has a plurality of outputs for connection to receiver means of a corresponding plurality of operators of the antenna system, the receive splitter network being arranged to split a receive signal received by the antenna assembly thereby to apply the received signal to each of the receiver means.

11. An antenna system as claimed in claim 2, wherein the combiner means is arranged to generate phase adjusted output signals simultaneously for each of a plurality of operators, and the antenna system further comprises a splitter arrangement for receiving the phase adjusted output signals and for splitting and distributing the phase adjusted output signals to the elements of the antenna assembly.

12. An antenna system as claimed in claim 11, wherein the splitter arrangement is arranged to distribute signal strength of the phase adjusted signals in a substantially uniform distribution.

13. An antenna system as claimed in claim 2 further comprising phase compensation means for ensuring the phase difference applied to the signals on the feeder lines remains substantially constant between the control means and the antenna assembly.

14. An antenna system as claimed in claim 13 wherein the phase compensation means include first and second mixer assemblies arranged at opposite ends of the first and second feeder lines.

15. An antenna system for use in at least one of transmitting and receiving first and second signals, the first signal being in a first frequency band associated with a first operator and the second signal being in a second frequency band associated with a second operator, the antenna system comprising:
   a) an antenna assembly having an adjustable angle of electrical tilt, and including a plurality of antenna elements for at least one of transmitting and receiving the first and second signals;
   b) control means for controlling electrically the phase of the first and second signals and thereby to control the angle of electrical tilt of the antenna assembly;
   c) combiner means for enabling the antenna assembly to at least one of transmit and receive the first signal at a first angle of electrical tilt and the second signal at a second angle of electrical tilt, the combiner means being arranged such that the first and second signals pass via shared antenna elements;
   d) first and second feeder lines for supplying first and second signals of a first polarisation to and from the antenna assembly; and
   e) phase compensation means for ensuring the phase difference applied to the signals on the feeder lines remains substantially constant between the control means and the antenna assembly, the phase compensation means being arranged to measure, for a plurality of operator frequency bands, a transmit path phase difference measurement derived from the difference in phase difference between signals supplied to the antenna elements along a transmit path, and including feedback means for feeding back the transmit path phase difference measurements to the control means, and wherein the control means includes means for adjusting the phase of signals supplied to the first and second feeder lines for each of the operator frequency bands in dependence upon the respective transmit path phase difference measurement, thereby to permit differences in the phase difference in different operator frequency bands to be compensated for.

16. An antenna system as claimed in claim 15, wherein the transmit path includes the first and second feeder lines for supplying transmit signals from the combiner means to the antenna assembly, and first and second respective carrier lines, forming part of the antenna assembly, providing a means of connection between the first and second feeder lines and the antenna elements.

17. An antenna system as claimed in claim 15 comprising a Vector Measuring Receiver Module in the antenna assembly having means for extracting a portion of the signals supplied to the antenna elements and means for combining the extracted portion with an oscillator signal having a frequency dependent upon a selected operator frequency band, thereby to determine the transmit path phase difference measurement for each operator frequency band.

18. An antenna system as claimed in claim 17 wherein the Vector Measuring Receiver Module includes first and second phase comparator units to enable in-phase and quadrature phase difference measurements to be obtained, thereby to determine an unambiguous measurement of the phase difference.

19. An antenna system for use in at least one of transmitting and receiving first and second signals, the first signal being in a first frequency band associated with a first operator and the second signal being in a second frequency band associated with a second operator, the antenna system comprising:
   a) an antenna assembly having an adjustable angle of electrical tilt, and including a plurality of antenna elements for at least one of transmitting and receiving the first and second signals;
   b) control means for controlling electrically the phase of the first and second signals and thereby to control the angle of electrical tilt of the antenna assembly;
   c) combiner means for enabling the antenna assembly to at least one of transmit and receive the first signal at a first angle of electrical tilt and the second signal at a second angle of electrical tilt, the combiner means being arranged such that the first and second signals pass via shared antenna elements;
   d) first and second feeder lines for supplying first and second signals of a first polarisation to and from the antenna assembly; and
   e) phase compensation means for ensuring the phase difference applied to the signals on the feeder lines remains substantially constant between the control means and the antenna assembly, the phase compensation means being arranged to measure, for a plurality of operator frequency bands, a receive path phase difference measurement derived from the difference in phase difference between signals received at the antenna elements and transmitted along a receive path to the control means, and feedback means for feeding back the receive path phase difference measurements to the control means, and wherein the control means includes means for adjusting the phase of signals supplied to the first and second feeder lines for each of the operator frequency bands in dependence upon the respective receive path phase difference measurement, thereby to permit differences in the said phase difference in different operator frequency bands to be compensated for.

20. An antenna system as claimed in claim 19, wherein the antenna assembly includes oscillator means for generating a receive path calibration signal which is supplied through the receive path for the purpose of determining the receive path phase difference measurement in addition to the transmit path phase difference measurement.

21. An antenna system as claimed in claim 20, wherein the receive path includes the first and second feeder lines and first and second carrier lines of the transmit path.

22. An antenna system as claimed in claim 20 wherein the oscillator means is a tone generator for generating a tone signal to be supplied through the receive path.

23. An antenna system as claimed in claim 22 wherein for a selected operator frequency band, the tone signal has a frequency intermediate between adjacent operator frequency bands, and one of the adjacent operator frequency bands is the selected operator frequency band.

24. An antenna system as claimed in claim 22 wherein for a selected operator frequency band, the tone signal falls within the selected operator frequency band.

25. An antenna system as claimed in claim 20 wherein the oscillator means is arranged to transmit a receive path calibration signal in a bandwidth of around 200 Hz.

26. A phase compensation apparatus for use in an antenna assembly for multi-operator use having a plurality of antenna elements, each operator transmitting and/or receiving signals within a different operator frequency band, the apparatus comprising:
   a) control means for controlling electrically the phase of signals transmitted and/or received by the antenna assembly, thereby to control an angle of electrical tilt of the antenna assembly;
   b) means for measuring, for a plurality of operator frequency bands, a transmit path phase difference measurement derived from the difference in phase difference between signals supplied along a transmit path having first and second feeder lines to the antenna elements;
   c) means for measuring, for a plurality of the operator frequency bands, a receive path phase difference measurement derived from the difference in phase difference between signals supplied along a receive path from the antenna elements to the control means; and
   d) feedback means for feeding back the transmit and receive path phase difference measurements to the control means, the control means including means for adjusting the phase of signals supplied to the antenna elements for each operator frequency band in dependence upon the transmit and receive path phase difference measurements for the associated operator frequency band.

27. A compensation method for an antenna assembly having a plurality of antenna elements, the antenna assembly being for multi-operator use and each operator transmitting and/or receiving signals within a different operator frequency band, the method comprising:
   a) controlling electrically the phase of signals transmitted and/or received by the antenna assembly, thereby to control an angle of electrical tilt of the antenna assembly;
   b) measuring, for a plurality of the operator frequency bands, a transmit path phase difference measurement derived from the difference in phase difference between signals supplied along a transmit path having first and second feeder lines to antenna elements;
   c) measuring, for a plurality of the operator frequency bands, a receive path phase difference measurement derived from the difference in phase difference between signals supplied along a receive path, including the first and second feeder lines, from the antenna elements;
   d) feeding back the transmit and receive path phase difference measurements to the control means; and
   e) adjusting the phase of signals supplied to the antenna elements for each of the operator frequency bands in dependence upon the respective transmit and receive path phase difference measurements, thereby to permit differences in the phase differences for different operator frequency bands to be compensated for.

28. An antenna system as claimed in claim 1 wherein the control means is arranged to provide capability for controlling the angle of electrical tilt of the antenna assembly to be different in transmit mode to that in receive mode.

* * * * *

UNITED STATES PATENT AND TRADEMARK OFFICE
CERTIFICATE OF CORRECTION

PATENT NO. : 7,230,570 B2
APPLICATION NO. : 10/495478
DATED : June 12, 2007
INVENTOR(S) : Thomas et al.

It is certified that error appears in the above-identified patent and that said Letters Patent is hereby corrected as shown below:

At column 24, line 51, delete "VRMC" and replace with -- VMRC --.

At column 29, line 67, delete "second signals" and replace with -- second signal --.

Signed and Sealed this

Twenty-eighth Day of August, 2007

JON W. DUDAS
*Director of the United States Patent and Trademark Office*